US010662342B2

(12) United States Patent
Soma et al.

(10) Patent No.: US 10,662,342 B2
(45) Date of Patent: May 26, 2020

(54) AQUEOUS INK

(71) Applicant: KAO CORPORATION, Tokyo (JP)

(72) Inventors: Hiroto Soma, Wakayama (JP); Hiroshi Mizuhata, Wakayama (JP)

(73) Assignee: KAO CORPORATION, Tokyo (JP)

(*) Notice: Subject to any disclaimer, the term of this patent is extended or adjusted under 35 U.S.C. 154(b) by 107 days.

(21) Appl. No.: 15/564,375

(22) PCT Filed: Mar. 31, 2016

(86) PCT No.: PCT/JP2016/060722
§ 371 (c)(1),
(2) Date: Oct. 4, 2017

(87) PCT Pub. No.: WO2016/163305
PCT Pub. Date: Oct. 13, 2016

(65) Prior Publication Data
US 2018/0134906 A1 May 17, 2018

(30) Foreign Application Priority Data

Apr. 6, 2015 (JP) .................... 2015-077961
Jun. 16, 2015 (JP) .................... 2015-121349

(51) Int. Cl.
C09D 11/104 (2014.01)
B41J 2/01 (2006.01)
B41M 5/52 (2006.01)
C09D 11/106 (2014.01)
B41M 5/50 (2006.01)
B41M 5/00 (2006.01)
C09D 11/322 (2014.01)
C09D 11/32 (2014.01)

(52) U.S. Cl.
CPC .............. C09D 11/104 (2013.01); B41J 2/01 (2013.01); B41M 5/00 (2013.01); B41M 5/50 (2013.01); B41M 5/52 (2013.01); C09D 11/106 (2013.01); C09D 11/32 (2013.01); C09D 11/322 (2013.01)

(58) Field of Classification Search
CPC ..... C09D 11/104; C09D 11/106; C09D 11/32; C09D 11/322; B41J 2/01; B41M 5/00; B41M 5/50
USPC ....................................................... 523/160
See application file for complete search history.

(56) References Cited

U.S. PATENT DOCUMENTS

| 4,973,519 A | 11/1990 | Tortorici et al. |
| 2010/0203439 A1* | 8/2010 | Zhou .................... G03G 9/0804 430/108.6 |
| 2011/0088595 A1* | 4/2011 | Wilhelm ............... C09C 1/0015 106/502 |
| 2011/0257273 A1 | 10/2011 | Yabuuchi et al. |
| 2013/0083117 A1* | 4/2013 | Ohmoto ................. C09D 11/10 347/20 |
| 2013/0162703 A1* | 6/2013 | Tombs ................. B41M 5/0017 347/2 |

FOREIGN PATENT DOCUMENTS

| CN | 102250512 B | 7/2013 |
| JP | 8-259871 A | 10/1996 |
| JP | 2002-080761 A | 3/2002 |
| JP | 2010-116459 A | 5/2010 |
| JP | 2013-177526 A | 9/2013 |
| JP | 2013-193324 A | 9/2013 |
| JP | 2014-201622 A | 10/2014 |

OTHER PUBLICATIONS

Extended European Search Report dated Aug. 29. 2018 in Patent Application No. 16776472.9, 6 pages.
International Search Report dated Jun. 7, 2016 in PCT/JP2016/060722, filed on Mar. 31, 2016.

* cited by examiner

Primary Examiner — Hannah J Pak
(74) Attorney, Agent, or Firm — Oblon, McClelland, Maier & Neustadt, L.L.P.

(57) ABSTRACT

The present invention provides a water-based ink that is excellent in adhesion to a resin printing medium formed of a resin such as polyethylene terephthalate, polyvinyl chloride, polyethylene, polypropylene, nylon, etc., gloss and anti-blocking properties upon storage of the printing medium after printing. The present invention relates to [1] a water-based ink including a colorant, polyester resin particles and modified polyolefin resin particles, in which the polyester resin particles are constituted of a resin containing an amorphous polyester having a glass transition temperature of not lower than 40° C. and not higher than 100° C., and a mass ratio of the polyester resin particles to the modified polyolefin resin particles (polyester resin particles/modified polyolefin resin particles) is not less than 10/90 and not more than 90/10, and [2] an ink-jet printing method including the steps of allowing the water-based ink according to the above [1] to adhere onto a resin printing medium by an ink-jet printing method; and then heating the resin printing medium onto which the water-based ink is adhered, to a temperature of not lower than 40° C. and not higher than 100° C.

13 Claims, No Drawings

AQUEOUS INK

FIELD OF THE INVENTION

The present invention relates to a water-based ink and an ink-jet printing method.

BACKGROUND OF THE INVENTION

In the fields of commercial package printing or commercial label printing used for advertising purposes, etc., characters or images have been conventionally printed on a printing medium made of a resin such as PET (polyethylene terephthalate), PVC (polyvinyl chloride), PE (polyethylene), PP (polypropylene) and NY (nylon) using a solvent-based ink, a UV-curing ink, etc. On the other hand, from the viewpoint of reduction in environmental burden, saving of energy, safety, etc., it has been demanded to utilize an ink-jet printing method or a flexo-printing method as a printing method using a water-based ink. In particular, in the ink-jet printing method, droplets of ink are directly projected onto a recording member from very fine nozzles and allowed to adhere to the recording member to form the characters or images thereon. The ink-jet printing method has become rapidly spread because of various advantages such as easiness of full coloration, low cost, capability of using a plain paper as the recording member, non-contact with printed characters or images, etc. In consequence, it has been attempted to utilize the ink-jet printing method for printing the characters or images on the aforementioned resin printing medium.

Patent Literature 1 discloses a white ink for ink-jet printing which contains a white colorant, a first resin constituted of a polyester-based resin, a second resin constituted of at least one of a fluorene-based resin and a styrene-acrylic resin and a third resin constituted of a polyolefin-based wax, and which is capable of recording excellent images that solve at least one of problems including occurrence of cracks, deterioration in abrasion resistance and deterioration in adhesion properties.

Patent Literature 2 discloses an image printing method including an ink applying step of applying an ink composition that contains a colorant, polymer particles A containing a polyolefin component which are subjected to a modification treatment selected from chlorinating modification, acrylic modification and maleic anhydride modification, and polymer particles B having a structural moiety that is different from that of the polymer particles A, onto a recording base material in the form of an aggregate of non-ink absorbing or low-ink absorbing fibrous materials by an ink-jetting method. In the Patent Literature 2, it is also described that the images obtained by the image printing method are excellent in adhesion between the ink composition and the aggregate of non-ink absorbing or low-ink absorbing fibrous materials (nonwoven fabric formed of resin fibers, etc.) and rub fastness.

CITATION LIST

Patent Literatures

Patent Literature 1: JP 2013-177526A
Patent Literature 2: JP 2013-193324A

SUMMARY OF THE INVENTION

The present invention relates to the following aspects [1] and [2].

[1] A water-based ink including a colorant, polyester resin particles and modified polyolefin resin particles, in which the polyester resin particles are constituted of a resin containing an amorphous polyester having a glass transition temperature of not lower than 40° C. and not higher than 100° C., and a mass ratio of the polyester resin particles to the modified polyolefin resin particles (polyester resin particles/modified polyolefin resin particles) is not less than 10/90 and not more than 90/10.

[2] An ink-jet printing method including the steps of allowing the water-based ink according to the above aspect [1] to adhere onto a resin printing medium by an ink-jet printing method; and then heating the resin printing medium onto which the water-based ink is adhered, to a temperature of not lower than 40° C. and not higher than 100° C.

DETAILED DESCRIPTION OF THE INVENTION

However, the water-based ink tends to be hardly penetrated into resin recording media formed of PET, PVC, PP, NY, etc., because these recording media are formed of a non-water absorbing material, and therefore has low fusing properties and is incapable of achieving good adhesion to both of a high-polarity NY printing medium and a non-polarity PP printing medium. In addition, the water-based ink tends to be deteriorated in spreading over these resin recording media and therefore form an ink film having poor smoothness and insufficient gloss thereon. Furthermore, with the wide spread of ink-jet printing technologies, there is an increasing demand for inks having good anti-blocking properties upon storage of the recording media after printing (resistance to stacking of the recording media upon storage). However, no inks capable of satisfying all of these requirements have been conventionally obtained.

The present invention aims at providing a water-based ink that is excellent in not only adhesion to a non-water absorbing or low-water absorbing resin printing medium formed of PET, PVC, PP, NY, etc., which can be suitably used, in particular, for commercial and industrial label printing, and gloss, but also anti-blocking properties upon storage of the printing medium after printing.

The present inventors have made various studies based on the consideration that in order to solve the aforementioned conventional problems as to the water-based ink, it is important that after printing characters or images on the surface of the resin printing medium using the water-based ink, components of the ink are capable of forming a stable protective film having high adhesion to the resin printing medium. As a result, it has been found that by incorporating polyester resin particles containing an amorphous polyester having specific thermal properties and modified polyolefin resin particles into the water-based ink, the resulting ink can be improved in adhesion to various non-water absorbing or low-water absorbing resin recording media, gloss and anti-blocking properties.

That is, the present invention relates to the following aspects [1] and [2].

[1] A water-based ink including a colorant, polyester resin particles and modified polyolefin resin particles, in which the polyester resin particles are constituted of a resin containing an amorphous polyester having a glass transition temperature of not lower than 40° C. and not higher than 100° C., and a mass ratio of the polyester resin particles to the modified polyolefin resin particles (polyester resin particles/modified polyolefin resin particles) is not less than 10/90 and not more than 90/10.

[2] An ink-jet printing method including the steps of allowing the water-based ink according to the above aspect [1] to adhere onto a resin printing medium by an ink-jet printing method; and then heating the resin printing medium onto which the water-based ink is adhered, to a temperature of not lower than 40° C. and not higher than 100° C.

In accordance with the present invention, it is possible to provide a water-based ink that is excellent in adhesion to a non-water absorbing or low-water absorbing resin printing medium formed of PET, PVC, PP, NY, etc., gloss and anti-blocking properties upon storage of the printing medium after printing.

[Water-Based Ink]

The water-based ink of the present invention includes a colorant, polyester resin particles and modified polyolefin resin particles.

The resin constituting the polyester resin particles contains an amorphous polyester having a glass transition temperature of not lower than 40° C. and not higher than 100° C. The mass ratio of the polyester resin particles to the modified polyolefin resin particles (polyester resin particles/modified polyolefin resin particles) is not less than 10/90 and not more than 90/10.

Meanwhile, in the present specification, the "water-based ink" is hereinafter also referred to merely as an "ink".

In accordance with the present invention, it is possible to provide a water-based ink that is excellent in adhesion to a non-water absorbing or low-water absorbing resin printing medium formed of PET, PVC, PP, NY, etc., gloss and anti-blocking properties upon storage of the printing medium after printing. The reason why the aforementioned advantages of the water-based ink can be attained by the present invention is considered as follows, though it is not clearly determined yet.

That is, a polyester contains a hydroxy group, a carboxy group, an ester group, etc., in a molecule thereof. For this reason, the water-based ink containing the polyester is capable of forming a hydrogen bond to a resin printing medium containing a polar group such as a PET film and therefore can exhibit good adhesion to such a resin printing medium. In addition, since the polyester in the water-based ink is plasticized because of its good affinity to water having high polarity, the water-based ink has a reduced glass transition temperature on the surface thereof, and is therefore capable of forming a coating film having high smoothness after printing, which results in excellent gloss of the printed characters or images. However, it tends to be difficult to attain sufficient adhesion of the water-based ink to a resin printing medium having low polarity such as a PP film.

On the other hand, the water-based ink of the present invention includes not only the polyester resin particles, but also the modified polyolefin resin particles. The polyolefin has high hydrophobicity and therefore can exhibit a strong intermolecular force relative to a non-polar resin medium, so that the resulting ink can be improved in adhesion to the PP film having low polarity. It might be considered that owing to poor compatibility between the polyester resin and the polyolefin resin, the ink containing both the resins tends to be deteriorated in adhesion to the film as well as smoothness on the surface thereof. However, in the present invention, the polyolefin is modified to such an extent that it can be compounded in the form of resin particles in the water-based ink. For this reason, the modified polyolefin has adequate polarity and is enhanced in affinity to the polyester. Therefore, it is considered that when the ink is formed into a coating film, the modified polyolefin is partially compatibilized with the polyester, so that the resulting ink exhibits high film-forming properties. Furthermore, since the glass transition temperature of the polyester used in the ink is controlled to a specific temperature range, the resulting coating film of the ink becomes a tough film containing both of a hard domain constituted of the polyester having a high cohesion force and a soft domain constituted of the polyolefin having high flexibility. As a result, the water-based ink of the present invention can be improved in not only adhesion to both of polar and non-polar resin recording media, but also anti-blocking properties upon storage of the recording media after printing. Moreover, since the polyester and the modified polyolefin are partially compatibilized with each other, the resulting film of the water-based ink can be enhanced in smoothness. Thus, it is considered that the water-based ink can exhibit excellent gloss because the ink can be prevented from suffering from deterioration in gloss inherent to the polyester even when the polyester is used in combination with the modified polyolefin.

In the water-based ink of the present invention, from the viewpoint of obtaining the ink that is excellent in adhesion to various resin recording media, gloss and anti-blocking properties upon storage of the recording media after printing, the mass ratio of the polyester resin particles to the modified polyolefin resin particles (polyester resin particles/modified polyolefin resin particles) is not less than 10/90 and not more than 90/10.

The mass ratio of the polyester resin particles to the modified polyolefin resin particles (polyester resin particles/modified polyolefin resin particles) is preferably not less than 20/80, more preferably not less than 30/70 and even more preferably not less than 40/60 from the viewpoint of obtaining the ink that is excellent in adhesion to various resin recording media, gloss and anti-blocking properties upon storage of the recording media after printing, and is also preferably not more than 80/20, more preferably not more than 70/30 and even more preferably not more than 60/40 from the viewpoint of obtaining the ink that is excellent in adhesion to various resin recording media and gloss.

The content of the polyester resin particles in the water-based ink is preferably not less than 0.5% by mass, more preferably not less than 1.0% by mass, even more preferably not less than 1.5% by mass and further even more preferably not less than 2.0% by mass, and is also preferably not more than 30% by mass, more preferably not more than 15% by mass, even more preferably not more than 10% by mass, further even more preferably not more than 5.0% by mass and still further even more preferably not more than 3.0% by mass, from the viewpoint of maintaining adequate viscosity of the resulting ink as well as from the viewpoint of obtaining the ink that is excellent in adhesion to various resin recording media, gloss and anti-blocking properties upon storage of the recording media after printing.

The content of the modified polyolefin resin particles in the water-based ink is preferably not less than 0.5% by mass, more preferably not less than 1.0% by mass, even more preferably not less than 1.5% by mass and further even more preferably not less than 2.0% by mass, and is also preferably not more than 30% by mass, more preferably not more than 15% by mass, even more preferably not more than 10% by mass, further even more preferably not more than 5.0% by mass and still further even more preferably not more than 3.0% by mass, from the viewpoint of maintaining adequate viscosity of the resulting ink as well as from the viewpoint of obtaining the ink that is excellent in adhesion to various resin recording media, gloss and anti-blocking properties upon storage of the recording media after printing.

The total content of the polyester resin particles and the modified polyolefin resin particles in the water-based ink is preferably not less than 1% by mass, more preferably not less than 2% by mass and even more preferably not less than 3% by mass, and is also preferably not more than 35% by mass, more preferably not more than 20% by mass, even more preferably not more than 15% by mass and further even more preferably not more than 10% by mass, from the viewpoint of maintaining adequate viscosity of the resulting ink as well as from the viewpoint of obtaining the ink that is excellent in adhesion to various resin recording media, gloss and anti-blocking properties upon storage of the recording media after printing.

The water-based ink may also contain resin particles other than the polyester resin particles and the modified polyolefin resin particles unless the advantageous effects of the present invention are adversely affected by inclusion thereof. Examples of the resin particles other than the polyester resin particles and the modified polyolefin resin particles include acrylic resin particles, vinyl chloride-based resin particles, polyurethane resin particles, etc. The content of the resin particles other than the polyester resin particles and the modified polyolefin resin particles in whole resin particles contained in the water-based ink is preferably not more than 0.5% by mass and more preferably not more than 0.2% by mass, and is also not less than 0% by mass.

The volume-average particle size ($D_v$) of the polyester resin particles is preferably not less than 40 nm, more preferably not less than 50 nm and even more preferably not less than 70 nm, and is also preferably not more than 500 nm, more preferably not more than 200 nm and even more preferably not more than 100 nm, from the viewpoint of obtaining the ink that is excellent in adhesion to various resin recording media, gloss and anti-blocking properties upon storage of the recording media after printing.

The volume-average particle size ($D_v$) of the modified polyolefin resin particles is preferably not less than 40 nm, more preferably not less than 50 nm, even more preferably not less than 60 nm and further even more preferably not less than 70 nm, and is also preferably not more than 500 nm, more preferably not more than 200 nm, even more preferably not more than 150 nm, further even more preferably not more than 120 nm and still further even more preferably not more than 100 nm, from the viewpoint of obtaining the ink that is excellent in adhesion to various resin recording media, gloss and anti-blocking properties upon storage of the recording media after printing.

The ratio of the volume-average particle size ($D_v$) of the polyester resin particles to the volume-average particle size ($D_v$) of the modified polyolefin resin particles (volume-average particle size ($D_v$) of polyester resin particles/volume-average particle size ($D_v$) of modified polyolefin resin particles) is preferably not less than 0.1, more preferably not less than 0.5, even more preferably not less than 0.7 and further even more preferably not less than 0.8, and is also preferably not more than 10, more preferably not more than 5.0, even more preferably not more than 2.0 and further even more preferably not more than 1.5, from the viewpoint of obtaining the ink that is excellent in adhesion to various resin recording media, gloss and anti-blocking properties upon storage of the recording media after printing.

The volume-average particle size ($D_v$) of the polyester resin particles and the volume-average particle size ($D_v$) of the modified polyolefin resin particles may be measured by a dynamic light scattering method, more specifically, may be measured by the method described in Examples below.

[Polyester Resin Particles]

The resin constituting the polyester resin particles used in the present invention contains an amorphous polyester having a glass transition temperature of not lower than 40° C. and not higher than 100° C. from the viewpoint of obtaining the ink that is excellent in gloss and anti-blocking properties upon storage of the recording media after printing.

(Amorphous Polyester)

The glass transition temperature of the amorphous polyester is preferably not lower than 50° C., more preferably not lower than 60° C. and even more preferably not lower than 62° C. from the viewpoint of obtaining the ink that is excellent in anti-blocking properties upon storage of the recording media after printing, and is also preferably not higher than 90° C., more preferably not higher than 82° C., even more preferably not higher than 75° C. and further even more preferably not higher than 70° C. from the viewpoint of obtaining the ink that is excellent in gloss.

The glass transition temperature of the resin may be measured using a differential scanning calorimeter, more specifically, may be measured by the method described in Examples below.

The content of the amorphous polyester in the resin constituting the polyester resin particles is preferably not less than 90% by mass, more preferably not less than 95% by mass, even more preferably not less than 98% by mass and further even more preferably 100% by mass from the viewpoint of obtaining the ink that is excellent in adhesion to various resin recording media, gloss and anti-blocking properties upon storage of the recording media after printing.

In addition, the content of the aforementioned amorphous polyester in the water-based ink is preferably not less than 0.5% by mass, more preferably not less than 1.0% by mass and even more preferably not less than 1.5% by mass, and is also preferably not more than 30% by mass, more preferably not more than 15% by mass and even more preferably not more than 10% by mass, from the viewpoint of maintaining adequate viscosity of the resulting ink as well as from the viewpoint of obtaining the ink that is excellent in adhesion to various resin recording media, gloss and anti-blocking properties upon storage of the recording media after printing.

The crystallinity of the polyester as used herein is expressed by a crystallinity index that is defined by a ratio of a softening point to an endothermic maximum peak temperature as measured using a differential scanning calorimeter (DSC) (i.e., softening point (° C.)/endothermic maximum peak temperature (° C.)). The crystalline polyester is defined as a polyester having a crystallinity index of not less than 0.6 and not more than 1.4. In consequence, the amorphous polyester as used herein means those polyester resins having a crystallinity index of more than 1.4 or less than 0.6.

The crystallinity index may be appropriately determined by controlling kinds and proportions of the raw material monomers used as well as production conditions such as reaction temperature, reaction time, cooling rate and the like. Meanwhile, the endothermic maximum peak temperature means a temperature of a peak having a largest peak area among endothermic peaks observed in the characteristic curve. When a difference between the endothermic maximum peak temperature and the softening point is within 20° C., the endothermic maximum peak temperature is regarded as a melting point of the resin, whereas when the difference between the endothermic maximum peak temperature and the softening point exceeds 20° C., the peak observed is regarded as a peak attributed to a glass transition of the resin.

The amorphous polyester contained in the polyester resin particles used in the present invention may be obtained by subjecting an alcohol component and a carboxylic acid component to polycondensation reaction. More specifically, the amorphous polyester is a polycondensate of the alcohol component and the carboxylic acid component.

Examples of the alcohol component include diols and trivalent or higher-valent polyhydric alcohols. Among these alcohol components, preferred are diols.

Examples of the diols include aliphatic diols having not less than 2 and not more than 12 main-chain carbon atoms, aromatic diols and alicyclic diols.

The aliphatic diols are preferably aliphatic diols having not less than 3 and not more than 6 carbon atoms which contain a hydroxy group bonded to a secondary carbon atom therein, from the viewpoint of obtaining the ink that is excellent in adhesion to various resin recording media, gloss and anti-blocking properties upon storage of the recording media after printing.

Examples of the aliphatic diols include ethylene glycol, 1,2-propanediol, 1,3-propanediol, 1,4-butanediol, 1,6-hexanediol, 1,8-octanediol, 1,9-nonanediol, 1,10-decanediol and 1,12-dodecanediol.

Examples of the aliphatic diols having not less than 3 and not more than 6 carbon atoms which contain a hydroxy group bonded to a secondary carbon atom therein include 1,2-propanediol, 1,2-butanediol, 1,3-butanediol, 2,3-butanediol, 1,2-pentanediol, 1,4-pentanediol, 2,4-pentanediol, 1,2-hexanediol, 1,5-hexanediol, 2,5-hexanediol and 3,3-dimethyl-1,2-butanediol. Among these aliphatic diols having not less than 3 and not more than 6 carbon atoms, preferred is at least one aliphatic diol selected from the group consisting of 1,2-propanediol and 2,3-butanediol, and more preferred is 1,2-propanediol.

Examples of the aromatic diols include alkyleneoxide adducts of bisphenol A, etc.

From the viewpoint of obtaining the ink that is excellent in adhesion to various resin recording media, gloss and anti-blocking properties upon storage of the recording media after printing, the alkyleneoxide adducts of bisphenol A are preferably those compounds represented by the following general formula (I):

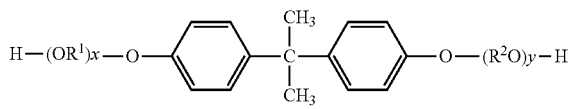

(I)

In the general formula (I), $OR^1$ and $R^2O$ are respectively an alkyleneoxy group, preferably each independently an alkyleneoxy group having not less than 1 and not more than 4 carbon atoms, more preferably an ethyleneoxy group or a propyleneoxy group, and even more preferably a propyleneoxy group.

The suffixes x and y each correspond to a molar number of addition of the alkyleneoxide. In addition, from the viewpoint of attaining good reactivity with the carboxylic acid component, an average value of a sum of x and y is preferably not less than 2. From the same viewpoint as described above, the average value of a sum of x and y is also preferably not more than to 7, more preferably not more than 5 and even more preferably not more than 3.

Furthermore, the $OR^1$ groups in the number of x and the $R^2O$ groups in the number of y may be respectively the same or different from each other. From the viewpoints of improving fusing properties of the ink onto a printing medium, the $R^1O$ groups and the $R^2O$ groups are respectively preferably identical to each other. These alkyleneoxide adducts of bisphenol A may be used alone or in combination of any two or more thereof. Examples of the preferred alkyleneoxide adducts of bisphenol A include propyleneoxide adducts of bisphenol A and ethyleneoxide adducts of bisphenol A. Among these alkyleneoxide adducts of bisphenol A, more preferred are propyleneoxide adducts of bisphenol A.

Examples of the aliphatic diols include cyclohexanediol, cyclohexane dimethanol and hydrogenated products of bisphenol A.

Among these alcohol components, from the viewpoint of obtaining the ink that is excellent in adhesion to various resin recording media, preferred is at least one compound selected from the group consisting of alkyleneoxide adducts of bisphenol A, hydrogenated products of bisphenol A and aliphatic diols having not less than 3 and not more than 6 carbon atoms which contain a hydroxy group bonded to a secondary carbon atom therein, more preferred is at least one compound selected from the group consisting of alkyleneoxide adducts of bisphenol A and hydrogenated products of bisphenol A, even more preferred are alkyleneoxide adducts of bisphenol A, and further even more preferred are propyleneoxide adducts of bisphenol A.

These alcohol components may be used alone or in combination of any two or more thereof.

The content of the alkyleneoxide adducts of bisphenol A in the alcohol component of the polyester is preferably not less than 50 mol %, more preferably not less than 80 mol % and even more preferably not less than 90 mol %, and is also not more than 100 mol %, from the viewpoint of obtaining the ink that is excellent in adhesion to various resin recording media, gloss and anti-blocking properties upon storage of the recording media after printing.

Examples of the carboxylic acid component include dicarboxylic acids, trivalent or higher-valent polycarboxylic acids, and anhydrides and alkyl (having not less than 1 and not more than 3 carbon atoms) esters of these acids. Of these carboxylic acid components, from the viewpoint of obtaining the ink that is excellent in adhesion to various resin recording media, preferred are those carboxylic acid components containing the dicarboxylic acids, and more preferred are those carboxylic acid components consisting of the dicarboxylic acids.

Examples of the dicarboxylic acids include aromatic dicarboxylic acids, aliphatic dicarboxylic acids and alicyclic dicarboxylic acids.

Meanwhile, the carboxylic acid component may also include, in addition to these free acids, anhydrides capable of producing an acid by decomposition thereof during the reaction, and alkyl (having not less than 1 and not more than 3 carbon atoms) esters of the respective carboxylic acids.

Examples of the aromatic dicarboxylic acids include phthalic acid, isophthalic acid and terephthalic acid. Of these aromatic dicarboxylic acids, from the viewpoint of obtaining the ink that is excellent in adhesion to various resin recording media, preferred is terephthalic acid.

Examples of the aliphatic dicarboxylic acids include fumaric acid, adipic acid, sebacic acid, maleic acid, azelaic acid, succinic acid and substituted succinic acids containing an alkyl group having not less than 1 and not more than 20 carbon atoms or an alkenyl group having not less than 2 and not more than 20 carbon atoms as a substituent group.

Specific examples of the substituted succinic acids containing an alkyl group having not less than 1 and not more than 20 carbon atoms or an alkenyl group having not less than 2 and not more than 20 carbon atoms as a substituent group include dodecyl succinic acid, dodecenyl succinic acid and octenyl succinic acid. Among these aliphatic clicarboxylic acids, from the viewpoint of obtaining the ink that is excellent in adhesion to various resin recording media, preferred is at least one compound selected from the group consisting of fumaric acid, adipic acid, sebacic acid and dodecenyl succinic acid, and more preferred is fumaric acid or adipic acid.

Examples of the alicyclic dicarboxylic acids include cyclohexanedicarboxylic acid, etc. Examples of the trivalent or higher-valent polycarboxylic acids include trimellitic acid, 2,5,7-naphthalene-tricarboxylic acid and pyromellitic acid.

As the carboxylic acid component, from the viewpoint of obtaining the ink that is excellent in adhesion to various resin recording media, preferred is at least one compound selected from the group consisting of isophthalic acid, terephthalic acid, fumaric acid, adipic acid, sebacic acid and dodecenyl succinic acid, and more preferred is at least one compound selected from the group consisting of terephthalic acid, fumaric acid and adipic acid.

These carboxylic acid components may be used alone or in combination of any two or more kinds thereof.

The mole equivalent ratio of a carboxy group (COOH group) of the carboxylic acid component to a hydroxy group (OH group) of the alcohol component used in the present invention (COOH group/OH group) is preferably not less than 0.65 and more preferably not less than 0.80, and is also preferably not more than 1.2 and more preferably not more than 1.1, from the viewpoint of obtaining the ink that is excellent in adhesion to various resin recording media.

The glass transition temperature of the amorphous polyester is the same as described above.

The softening point of the amorphous polyester is preferably not lower than 70° C., more preferably not lower than 80° C. and even more preferably not lower than 90° C. from the viewpoint of obtaining the ink that is excellent in adhesion to various resin recording media, and is also preferably not higher than 165° C., more preferably not higher than 130° C. and even more preferably not higher than 110° C. from the same viewpoint as described above.

Meanwhile, in the case where the polyester is used in the form of a mixture of two or more kinds of polyesters, the glass transition temperature and the softening point of the polyester mean a glass transition temperature and a softening point of the mixture which are respectively the values as measured by the method described in Examples below.

The acid value of the amorphous polyester is preferably not less than 5 mgKOH/g, more preferably not less than 10 mgKOH/g and even more preferably not less than 15 mgKOH/g, and is also preferably not more than 35 mgKOH/g, more preferably not more than 30 mgKOH/g and even more preferably not more than 25 mgKOH/g, from the viewpoint of improving dispersion stability of the resin particles in an aqueous medium.

The softening point, glass transition temperature and acid value of the amorphous polyester may be respectively controlled to desired values by appropriately adjusting kinds and compounding proportions of the monomers used for production of the polyester as well as the polycondensation reaction conditions such as the reaction temperature and the reaction time.

These amorphous polyesters may be used alone or in combination of any two or more thereof.

The amorphous polyester may be produced by subjecting a carboxylic acid component and an alcohol component to polycondensation reaction. For example, the aforementioned alcohol component and carboxylic acid component may be subjected to polycondensation reaction in an inert gas atmosphere at a temperature of not lower than 120° C. and not higher than 250° C., if required, in the presence of an esterification catalyst and a polymerization inhibitor to thereby produce the amorphous polyester.

Examples of the esterification catalyst that may be used in the polycondensation reaction include tin compounds such as dibutyl tin oxide and tin di(2-ethyl hexanoate), and titanium compounds such as titanium diisopropylate bistriethanol aminate.

The amount of the esterification catalyst used in the polycondensation reaction is preferably not less than 0.01 part by mass and more preferably not less than 0.1 part by mass, and is also preferably not more than 1.5 parts by mass and more preferably not more than 1.0 part by mass, on the basis of 100 parts by mass of a total amount of the carboxylic acid component and the alcohol component, though it is not particularly limited thereto.

In addition, a radical polymerization inhibitor may be used in the polycondensation reaction, if required. Examples of the radical polymerization inhibitor include 4-tert-butyl catechol, etc. The amount of the radical polymerization inhibitor used in the polycondensation reaction is preferably not less than 0.01 part by mass and more preferably not less than 0.05 part by mass, and is also preferably not more than 0.5 part by mass and more preferably not more than 0.1 part by mass, on the basis of 100 parts by mass of a total amount of the carboxylic acid component and the alcohol component.

Meanwhile, in the present invention, the polyester includes not only an unmodified polyester, but also a modified polyester obtained by modifying a polyester to such an extent that substantially no adverse influence is exerted on properties of the polyester, as long as it has an acid group. As the modified polyester, there may be mentioned those grafted or blocked polyesters obtained by grafting or blocking the polyester with phenol, urethane, epoxy, etc., by the methods described, for example, in JP 11-133668A, JP 10-239903A and JP 8-20636A, and composite resins containing two or more kinds of resin units including a polyester unit, etc.

The polyester resin particles may also contain resins other than the polyester unless the advantageous effects of the present invention are adversely affected by inclusion thereof. Examples of the resins other than the polyester include those resins such as a styrene-acrylic copolymer, an epoxy resin, a polycarbonate, a polyurethane, etc.

Furthermore, the polyester resin particles may also contain, as an optional component, various additives such as a reinforcing filler such as fibrous substances, an antioxidant and an anti-aging agent, if required, unless the advantageous effects of the present invention are adversely affected by inclusion thereof.

(Method for Production of Polyester Resin Particles)

The polyester resin particles are preferably produced in the form of a dispersion of the polyester resin particles by the method of dispersing the resins containing the aforementioned polyester in an aqueous medium.

The aqueous medium used in the present invention preferably contains water as a main component. From the viewpoints of improving dispersion stability of the dispersion of the resin particles and attaining good environmental safety, the content of water in the aqueous medium is preferably not less than 80% by mass and more preferably not less than 90% by mass, and is also not more than 100% by mass, and even more preferably 100% by mass. As the water, deionized water, ion-exchanged water or distilled water is preferably used. Examples of components other than water which may be contained in the aqueous medium include water-soluble organic solvents, e.g., alcohols solvents such as methanol, ethanol, isopropanol and butanol; ketones solvents such as acetone and methyl ethyl ketone; and ether solvents such as tetrahydrofuran.

As the method of obtaining the dispersion of the polyester resin particles, there may be used a method of adding the polyester-containing resin to the aqueous medium and subjecting the resulting mixture to dispersion treatment using a disperser or the like, a method of gradually adding the aqueous medium to the polyester-containing resin to subject the resulting solution to phase inversion emulsification, and the like. Among these methods, the method using the phase inversion emulsification is preferred from the viewpoint of obtaining the water-based ink that is excellent in adhesion to various resin recording media, and gloss. As the phase inversion emulsification method, there is preferably used the method in which the polyester-containing resin is first dissolved in an organic solvent to prepare an organic solvent solution of the polyester-containing resin, and then the aqueous medium is added to the thus obtained solution to subject the solution to phase inversion emulsification, followed by removing the organic solvent from the resulting emulsion. In the following, the phase inversion emulsification method is described.

[Phase Inversion Emulsification Method]

First, the polyester-containing resin is dissolved in an organic solvent to prepare a solution containing the polyester.

In the case where the polyester is constituted of a plurality of polyesters or further contains resins other than the polyester, the solution containing the polyester may be produced by dissolving in the organic solvent a mixture prepared by previously mixing these polyesters or mixing the polyester with the other resins, or by simultaneously adding and dissolving these resins in the organic solvent.

In addition, from the viewpoint of improving affinity of the polyester-containing resin to an aqueous medium as well as improving dispersion stability of the dispersion of the resin particles, a basic aqueous solution may be used in the aforementioned method.

As the method of producing the polyester-containing solution, there is preferably used the method in which the polyester-containing resin and the organic solvent are added into a reaction vessel to dissolve the resin in the organic solvent, and then the basic aqueous solution is added to the reaction vessel, and the contents of the reaction vessel are stirred using a stirrer to obtain a solution thereof.

The procedures of dissolving the polyester-containing resin in the organic solvent and then adding the basic aqueous solution to the resulting solution may be usually carried out at a temperature not higher than a boiling point of the organic solvent.

As the organic solvent used in the aforementioned method, from the viewpoints of well dissolving the polyester-containing resin and facilitating removal of the organic solvent from the resulting emulsion, preferred are dialkyl ketones containing an alkyl group having not less than 1 and not more than 3 carbon atoms, such as acetone and methyl ethyl ketone, and more preferred is methyl ethyl ketone.

The mass ratio of the organic solvent to the polyester-containing resin (organic solvent/resin) is preferably not less than 30/100, more preferably not less than 50/100 and even more preferably not less than 70/100, and is also preferably not more than 500/100, more preferably not more than 300/100, even more preferably not more than 200/100 and further even more preferably not more than 150/100, from the viewpoint of facilitating dissolution of the resin and phase inversion emulsification of the resulting solution into the aqueous medium as well as from the viewpoint of improving dispersion stability of the dispersion of the resin particles.

As the basic compound used in the basic aqueous solution, there may be mentioned an inorganic basic compound and an organic basic compound.

Examples of the inorganic basic compound include hydroxides, carbonates and hydrogen carbonates of alkali metals such as potassium, sodium and lithium. Specific examples of the inorganic basic compound include sodium hydroxide, potassium hydroxide, sodium carbonate, potassium carbonate, sodium hydrogen carbonate and potassium hydrogen carbonate. As the inorganic basic compound, there may also be used ammonia. Examples of the organic bases used as the basic compound include alkanol amines such as diethyl ethanol amine. Among these basic compounds, from the viewpoint of improving dispersion stability of the dispersion of the resin particles, preferred are sodium hydroxide, potassium hydroxide, sodium carbonate and potassium carbonate, and more preferred is sodium hydroxide.

The equivalent (mol %) of the basic compound used on the basis of the acid group of the resin is preferably not less than 10 mol %, more preferably not less than 30 mol % and even more preferably not less than 50 mol %, and is also preferably not more than 150 mol %, more preferably not more than 120 mol % and even more preferably not more than 100 mol %, from the viewpoint of improving dispersion stability of the resin particles.

Meanwhile, the equivalent (mol %) of the basic compound used may be calculated according to the following formula. When the equivalent of the basic compound used is not more than 100 mol %, the equivalent of the basic compound has the same meaning as the degree of neutralization of the resin. On the other hand, when the equivalent of the neutralizing agent used as calculated according to the following formula exceeds 100 mol %, it is meant that the neutralizing agent is present in an excessive amount relative to the acid group of the resin, and in such a case, the degree of neutralization of the resin is regarded as being 100 mol %.

Equivalent (mol %) of basic compound used=[{mass (g) of basic compound added/equivalent of basic compound}/[{acid value of resin (mgKOH/×mass (g) of resin}/(56×1000)]]×100.

The concentration of the basic compound in the basic aqueous solution is preferably not less than 1% by mass and more preferably not less than 3% by mass, and is also preferably not more than 60% by mass and more preferably not more than 50% by mass, from the viewpoints of improving dispersion stability of the dispersion of the resin particles and enhancing productivity thereof.

Next, the aqueous medium is added to the aforementioned polyester-containing solution to subject the solution to phase inversion, thereby obtaining an aqueous dispersion of the polyester-containing resin particles.

The temperature used upon adding the aqueous medium is preferably not lower than 10° C., more preferably not lower than 20° C. and even more preferably not lower than 25° C., and is also preferably not higher than 80° C. and more preferably not higher than 75° C., from the viewpoint of improving dispersion stability of the dispersion of the resin particles.

From the viewpoint of improving dispersion stability of the dispersion of the resin particles, the velocity of addition of the aqueous medium until terminating the phase inversion is preferably not less than 0.5 part by mass/minute, more preferably not less than 1 part by mass/minute, even more preferably not less than 3 parts by mass/minute and further even more preferably not less than 5 parts by mass/minute, and is also preferably not more than 100 parts by mass/minute, more preferably not more than 50 parts by mass/minute, even more preferably not more than 20 parts by mass/minute and further even more preferably not more than 15 parts by mass/minute, on the basis of 100 parts by mass of the resin constituting the resin particles. However, the velocity of addition of the aqueous medium after terminating the phase inversion is not particularly limited.

The amount of the aqueous medium added is preferably not less than 50 parts by mass, more preferably not less than 100 parts by mass and even more preferably not less than 150 parts by mass, and is also preferably not more than 900 parts by mass, more preferably not more than 500 parts by mass and even more preferably not more than 400 parts by mass, on the basis of 100 parts by mass of the resin constituting the resin particles, from the viewpoint of enhancing productivity of the aqueous dispersion.

After completion of the phase inversion emulsification, the organic solvent may be removed from the dispersion obtained by the phase inversion emulsification, if required.

The method of removing the organic solvent from the dispersion is not particularly limited, and any optional methods may be used for this purpose. However, since the organic solvent is dissolved in water, distillation is preferably used as the method of removing the organic solvent from the dispersion.

The thus obtained aqueous dispersion of the polyester resin particles is preferably subjected to filtration using a wire mesh screen, etc., to remove coarse particles, etc., from the dispersion. In addition, in the case where the removal of the organic solvent from the dispersion is conducted by the aforementioned method, since water is also removed together with the organic solvent owing to azeotropic distillation thereof, it is preferred that water is added to the resulting dispersion to adjust a solid content thereof as desired.

The solid content of the aqueous dispersion of the polyester resin particles after being adjusted by the addition of water is preferably not less than 5% by mass, more preferably not less than 10% by mass, even more preferably not less than 20% by mass and further even more preferably not less than 25% by mass, and is also preferably not more than 50% by mass, more preferably not more than 45% by mass, even more preferably not more than 40% by mass and further even more preferably not more than 35% by mass, from the viewpoint of obtaining the ink that is excellent in adhesion to various resin recording media.

The pH value of the obtained aqueous dispersion of the polyester resin particles is preferably not less than 6.0, more preferably not less than 6.5 and even more preferably not less than 6.8, and is also preferably not more than 9.0, more preferably not more than 8.0 and even more preferably not more than 7.5, from the viewpoint of obtaining the ink that is excellent in adhesion to various resin recording media.

[Modified Polyolefin Resin Particles]

The content of the modified polyolefin in the resin constituting the modified polyolefin resin particles used in the present invention is preferably not less than 70% by mass, more preferably not less than 80% by mass, even more preferably not less than 90% by mass and further even more preferably not less than 95% by mass, and is also not more than 100% by mass, from the viewpoint of obtaining the ink that is excellent in gloss and anti-blocking properties upon storage of the recording media after printing.

In addition, the content of the modified polyolefin in the water-based ink is preferably not less than 0.5% by mass, more preferably not less than 1.0% by mass, even more preferably not less than 1.5% by mass and further even more preferably not less than 2.0% by mass, and is also preferably not more than 25% by mass, more preferably not more than 15% by mass and even more preferably not more than 10% by mass, from the viewpoint of maintaining adequate viscosity of the resulting ink as well as from the viewpoint of obtaining the ink that is excellent in adhesion to various resin recording media, gloss and anti-blocking properties upon storage of the recording media after printing.

The modified polyolefin resin particles may also contain resins other than the modified polyolefin unless the advantageous effects of the present invention are adversely affected by inclusion thereof. Examples of the resin other than the modified polyolefin include resins such as a styrene-acrylic copolymer, an epoxy resin, a polycarbonate, a polyurethane, etc.

The modified polyolefin resin particles used in the present invention are preferably obtained in the form of a dispersion of the modified polyolefin resin particles which is prepared by dispersing the resin containing the modified polyolefin in an aqueous medium, from the viewpoint of facilitating compounding of the resin particles in the water-based ink. More specifically, the modified polyolefin resin particles are preferably used in the form of an aqueous dispersion of the modified polyolefin resin particles.

[Modified Polyolefin]

The modified polyolefin contained in the modified polyolefin resin particles is not particularly limited as long as the modified polyolefin is in the form of a modified product of a homopolymer of an olefin or a copolymer of two or more kinds of olefins. Examples of the modified polyolefin include modified products of polypropylene, a propylene-α-olefin copolymer, an ethylene-vinyl acetate copolymer, etc. These copolymers may be in the form of either a block copolymer or a random copolymer.

The number of carbon atoms in the α-olefin contained in the propylene-α-olefin copolymer is preferably not less than 4, and is also preferably not more than 15, more preferably not more than 10 and even more preferably not more than 8, from the viewpoint of obtaining the ink that is excellent in adhesion to various resin recording media, gloss and anti-blocking properties upon storage of the recording media after printing.

Examples of the α-olefin include ethylene, 1-butene, 1-pentene, 1-hexene, 1-heptene, 1-octene and 4-methyl-1-pentene.

Among these polyolefins, from the viewpoint of obtaining the ink that is excellent in adhesion to various resin recording media, gloss and anti-blocking properties upon storage of the recording media after printing, preferred is polypropylene or the propylene-α-olefin copolymer.

In the case of using the propylene-α-olefin copolymer as the polyolefin, the content of the propylene component in the polyolefin is preferably not less than 60 mol %, more preferably not less than 65 mol % and even more preferably not less than 70 mol %, and is also preferably not more than 90 mol % and more preferably not more than 80 mol %, from the viewpoint of obtaining the ink that is excellent in adhesion to various resin recording media, gloss and anti-blocking properties upon storage of the recording media after printing.

The weight-average molecular weight of the modified polyolefin is preferably not less than 10,000, more preferably not less than 15,000 and even more preferably not less than 50,000, and is also preferably not more than 200,000 and more preferably not more than 150,000, from the viewpoint of obtaining the ink that is excellent in adhesion to various resin recording media, gloss and anti-blocking properties upon storage of the recording media after printing. The weight-average molecular weight is the value measured by gel permeation chromatography (reference standard substance: polystyrene).

As the modified polyolefin, from the viewpoint of obtaining the ink that is excellent in adhesion to various resin recording media, gloss and anti-blocking properties upon storage of the recording media after printing, preferred is a polyolefin that is modified with a chlorine-containing polarity-imparting agent (hereinafter also referred to merely as a "chlorinated polyolefin"), a polyolefin that is modified with an unsaturated carboxylic acid-based compound (hereinafter also referred to merely as an "acid-modified polyolefin") or a polyolefin that is modified with a hydroxy group (hereinafter also referred to merely as a "hydroxy-modified polyolefin"), and more preferred is a chlorinated polyolefin.

The chlorinated polyolefin may be produced by subjecting a polyolefin to chlorination reaction.

The chlorination reaction may be usually carried out by an ordinary reaction method. For example, the chlorination reaction of the polyolefin may take place by dispersing or dissolving the aforementioned polyolefin in water or a medium such as carbon tetrachloride and chloroform, and blowing a chlorine gas into the resulting dispersion or solution in a temperature range of not lower than 50° C. and not higher than 120° C. under applied pressure or under normal pressures either in the presence of a catalyst or under irradiation with an ultraviolet ray.

The aforementioned chlorine-based solvent used for production of the chlorinated polyolefin may be usually removed by distillation under reduced pressure, or replaced with an organic solvent.

The chlorine content of the chlorinated polyolefin is preferably not less than 10% by mass, more preferably not less than 15% by mass, even more preferably not less than 20% by mass and further even more preferably not less than 25% by mass, and is also preferably not more than 50% by mass, more preferably not more than 40% by mass and even more preferably not more than 35% by mass, from the viewpoint of obtaining the ink that is excellent in adhesion to various resin recording media, gloss and anti-blocking properties upon storage of the recording media after printing. The chlorine content as used in the present invention is the value measured according to JIS-K 7229.

The acid-modified polyolefin is in the form of a polyolefin that is modified with an unsaturated carboxylic acid-based compound.

As the unsaturated carboxylic acid-based compound, there may be mentioned at least one compound selected from the group consisting of an unsaturated carboxylic acid, an unsaturated carboxylic acid derivative and an unsaturated carboxylic acid anhydride. The unsaturated carboxylic acid means an unsaturated compound containing a carboxy group. The unsaturated carboxylic acid derivative means a mono- or di-ester, an amide, an imide, etc., of the unsaturated compound. The unsaturated carboxylic acid anhydride means an anhydride of the unsaturated compound. Among these unsaturated carboxylic acid-based compounds, preferred is the unsaturated carboxylic acid.

Specific examples of the unsaturated carboxylic acid-based compound include fumaric acid, maleic acid, itaconic acid, citraconic acid, aconitic acid, nadic acid and anhydrides of these acids; and methyl fumarate, ethyl fumarate, propyl fumarate, butyl fumarate, dimethyl fumarate, diethyl fumarate, dipropyl fumarate, dibutyl fumarate, methyl maleate, ethyl maleate, propyl maleate, butyl maleate, dimethyl maleate, diethyl maleate, dipropyl maleate, dibutyl maleate, maleimide, N-phenyl maleimide, (meth)acrylic acid, methyl (meth)acrylate, ethyl (meth)acrylate, cyclohexyl (meth) acrylate, lauryl (meth) acrylate, benzyl (meth) acrylate and N,N-dimethylaminoethyl (meth) acrylate. Of these unsaturated carboxylic acid-based compounds, preferred is maleic acid or acrylic acid.

The example of the method of acid-modifying the polyolefin is a method in which the polyolefin is modified by graft-copolymerizing the polyolefin with the unsaturated carboxylic acid-based compound and if required, a specific (meth)acrylic acid ester as a monomer.

The amount of the unsaturated carboxylic acid-based compound to be grafted to the polyolefin is preferably not less than 1% by mass, more preferably not less than 5% by mass and even more preferably not less than 8% by mass, and is also preferably not more than 20% by mass and more preferably not more than 15% by mass, on the basis of the polyolefin before being subjected to the acid modification.

The conditions of the acid modification of the polyolefin may be determined, for example, according to the method used for the acid modification, such as a melting method and a solution method.

In the case of using the melting method, the polyolefin is heated and fused (heat-melted) in the presence of a radical reaction initiator to subject the polyolefin to the modification reaction.

In the case of using the solution method, the polyolefin is dissolved in an organic solvent, and then the resulting solution is heated while stirring in the presence of a radical reaction initiator to subject the polyolefin to the modification reaction. Examples of the organic solvent used in the solution method include aromatic solvents such as toluene and xylene. The temperature used upon the modification reaction is preferably not lower than 100° C. and not higher than 180° C.

Examples of the radical reaction initiator used in the melting method and the solution method include organic peroxide-based compounds and azonitriles, etc.

The acid-modified polyolefin used herein may be further subjected to chlorination reaction. The method of conducting the chlorination reaction as well as the chlorine content of the resulting chlorinated product are the same as those described above.

In addition, as the hydroxy-modifying method, there may be used the method in which an olefin is polymerized in the presence of a hydroxy group-containing radical initiator or terminator to thereby introduce a hydroxy group into a terminal end of the resulting polyolefin, etc.

Furthermore, as the method of obtaining the modified polyolefin by introducing a hydroxy group or an amino group into the polyolefin, there is known such a method as described in JP 2768475C, i.e., the method in which the polyolefin is contacted with a hydroxy group- or amino group-containing ethylenically unsaturated compound in the presence of a radical initiator.

Examples of commercially available products of the modified polyolefin used in the present invention include "SUPERCHLON (registered trademark)" series products available from Nippon Paper Industries Co., Ltd., such as "SUPERCHLON E-415", "SUPERCHLON E-480T", "SUPERCHLON E-604" and "SUPERCHLON E-723"; "HARDLEN (registered trademark)" series products available from TOYOBO Co., Ltd., such as "HARDLEN EH-801", "HARDLEN NA-3002", "HARDLEN NZ-1001", "HARDLEN NZ-1004", "HARDLEN EW-5303" and "HARDLEN EZ-1001"; "AUROREN (registered trademark)" series products available from Nippon Paper Industries Co., such as "AUROREN AE-202" and "AUROREN AE-301"; "APTOLOCK (registered trademark)" series products available from MITSUBISHI CHEMICAL CORPORATION, such as "APTOLOCK BW-5550"; and "ARROWBASE (registered trademark)" series products available from UNITIKA Ltd., such as "ARROWBASE SA-1200", "ARROWBASE SB-1200", "ARROWBASE SB-1010" and "ARROWBASE SE-1200".

(Method of Producing Modified Polyolefin Resin Particles)

The modified polyolefin resin particles are preferably produced in the form of a dispersion of the modified polyolefin resin particles by the method of dispersing the aforementioned modified polyolefin-containing resin in an aqueous medium. In addition, there may also be used the modified polyolefin resin particles that are commercially available in the form of an aqueous product or an aqueous dispersion product.

The aqueous medium used for production of the dispersion of the modified polyolefin resin particles preferably contains water as a main component. From the viewpoints of improving dispersion stability of the dispersion of the resin particles and attaining good environmental safety, the content of water in the aqueous medium is preferably not less than 80% by mass and more preferably not less than 90% by mass, and is also not more than 100% by mass, and even more preferably 100% by mass. As the water, deionized water, ion-exchanged water or distilled water is preferably used.

Examples of components other than water which may be contained in the aqueous medium include water-soluble organic solvents, e.g., alcohols solvents such as methanol, ethanol, isopropanol and butanol; ketones solvents such as acetone and methyl ethyl ketone; and ether solvents such as tetrahydrofuran.

As the method of producing the modified polyolefin resin particles, there are preferably used the same methods as used for production of the aforementioned polyester resin particles. Examples of the method of producing the modified polyolefin resin particles include a method of adding the modified polyolefin-containing resin to the aqueous medium and subjecting the resulting mixture to dispersion treatment using a disperser or the like, a method of gradually adding the aqueous medium to the modified polyolefin-containing resin to subject the resulting mixture to phase inversion emulsification, and the like. In the phase inversion emulsification method, it is preferred that the modified polyolefin-containing resin is first dissolved in an organic solvent to prepare an organic solvent solution of the modified polyolefin-containing resin, and then the aqueous medium is added to the thus obtained solution to subject the solution to phase inversion emulsification, followed by removing the organic solvent from the resulting emulsion.

As the organic solvent used in the aforementioned methods, from the viewpoint of well dissolving the modified polyolefin-containing resin, there may be mentioned ketone solvents such as acetone, methyl ethyl ketone, methyl isobutyl ketone and diethyl ketone; ether solvents such as dibutyl ether, tetrahydrofuran and dioxane; acetic acid ester solvents such as ethyl acetate and isopropyl acetate; halogenated alkyl solvents such as dichloromethane and chloroform; and hydrocarbon solvents such as toluene. Of these organic solvents, from the viewpoint of facilitating removal of the organic solvents from the mixed solution obtained after adding the aqueous medium thereto, preferred is at least one solvent selected from the group consisting of ketone solvents and acetic acid ester solvents.

In addition, from the viewpoint of improving affinity of the modified polyolefin-containing resin to the aqueous medium as well as from the viewpoint of improving dispersion stability of the dispersion of the resin particles, the aforementioned basic compound and surfactant may be used in the aforementioned methods.

In addition, the preferred forms of the dispersing conditions, etc., are also the same as those used in the method for production of the aforementioned polyester resin particles.

The solid content of the dispersion of the modified polyolefin resin particles is preferably not less than 5% by mass, more preferably not less than 10% by mass, even more preferably not less than 20% by mass and further even more preferably not less than 25% by mass, and is also preferably not more than 50% by mass, more preferably not more than 45% by mass, even more preferably not more than 40% by mass and further even more preferably not more than 35% by mass, from the viewpoint of obtaining the ink that is excellent in adhesion to various resin recording media.

The pH value of the aqueous dispersion of the modified polyolefin resin particles is preferably not less than 6.0, more preferably not less than 6.5 and even more preferably not less than 6.8, and is also preferably not more than 9.0, more preferably not more than 8.0 and even more preferably not more than 7.5, from the viewpoint of obtaining the ink that is excellent in adhesion to various resin recording media.

[Colorant]

The colorant used in the present invention means either a pigment or a dye. In addition, the colorant may be present in the form of stable fine particles in the ink using a surfactant or a polymer for dispersing the colorant.

Examples of the colorant used in the present invention include a pigment, a hydrophobic dye, a water-soluble dye (such as an acid dye, a reactive dye and a direct dye), etc. Of these colorants, from the viewpoint of improving dispersion stability of the ink as well as water resistance, gloss and surface smoothness of the characters or images printed with the ink, preferred is at least one colorant selected from the group consisting of a pigment and a hydrophobic dye, and more preferred is a pigment.

The pigment may be either an inorganic pigment or an organic pigment.

Examples of the inorganic pigment include carbon blacks and metal oxides. The carbon blacks are preferably used for black inks.

Examples of the organic pigment include azo pigments, diazo pigments, phthalocyanine pigments, quinacridone pigments, isoindolinone pigments, dioxazine pigments, perylene pigments, perinone pigments, thioindigo pigments, anthraquinone pigments, and quinophthalone pigments. Of these organic pigments, preferred are phthalocyanine pigments, and more preferred is copper phthalocyanine.

The hue of the pigment used in the present invention is not particularly limited, and there may be used any chromatic color pigment having a yellow color, a magenta color, a cyan color, a blue color, a red color, an orange color, a green color, etc.

Specific examples of the organic pigments include one or more pigments selected from the group consisting of commercially available products marketed under the names C.I. Pigment Yellow, C.I. Pigment Red, C.I. Pigment Orange, C.I. Pigment Violet, C.I. Pigment Blue and C.I. Pigment Green, etc., with various product numbers.

In the present invention, there may also be used a self-dispersible pigment. The self-dispersible pigment as used herein means an inorganic or organic pigment which can be dispersible in an aqueous medium without using a surfactant or a resin by bonding at least one hydrophilic functional group (including an anionic hydrophilic group such as a carboxy group and a sulfonic group or a cationic hydrophilic group such as a quaternary ammonium group) either directly or through the other atom group to a surface of a pigment. Examples of the other atom group used herein include an alkanediyl group having not less than 1 and not more than 12 carbon atoms, a phenylene group and a naphthylene group.

The aforementioned pigments may be used alone or in the form of a mixture containing a combination of any two or more thereof at an optional mixing ratio.

The hydrophobic dye as used herein means a dye preferably having a solubility of less than 6% by mass as measured in 100 g of water (at 20° C.). Examples of the hydrophobic dye include oil-soluble dyes and disperse dyes.

The aforementioned colorants may be used alone or in the form of a mixture containing a combination of any two or more thereof at an optional mixing ratio.

From the viewpoint of obtaining the ink that is excellent in adhesion to various resin recording media, gloss and anti-blocking properties upon storage of the recording media after printing, the content of the colorant in the ink is preferably not less than 1% by mass, more preferably not less than 2% by mass and even more preferably not less than 3% by mass, and is also preferably not more than 25% by mass, more preferably not more than 10% by mass and even more preferably not more than 5% by mass.

The mass ratio of the colorant to a sum of the polyester resin particles and the modified polyolefin resin particles [colorant/(polyester resin particles+modified polyolefin resin particles)] in the ink is preferably not less than 10/90, more preferably not less than 20/80, even more preferably not less than 30/70 and further even more preferably not less than 40/60, and is also preferably not more than 80/20, more preferably not more than 70/30, even more preferably not more than 60/40 and further even more preferably not more than 50/50, from the viewpoint of attaining good ejection properties of the water-based ink as well as from the viewpoint of obtaining the ink that is excellent in adhesion to various resin recording media, gloss and anti-blocking properties upon storage of the recording media after printing.

[Colorant-Containing Polymer Particles]

The colorant is preferably used in the form of colorant-containing polymer particles that may be prepared by using a surfactant and a polymer together with the colorant.

In the following, the colorant-containing polymer particles are described.

The volume-average particle size ($D_v$) of the colorant-containing polymer particles is preferably not less than 40 nm and more preferably not less than 50 nm, and is also preferably not more than 200 nm and more preferably not more than 150 nm, from the viewpoint of enhancing image intensity of the ink. The volume-average particle size ($D_v$) of the colorant-containing polymer particles may be measured by a dynamic light scattering method, more specifically, may be measured by the method described in Examples below.

In the colorant-containing polymer particles, a water-insoluble polymer is preferably used as the polymer thereof from the viewpoint of improving water dispersibility of the polymer particles in the ink and enhancing image intensity of the ink. The "water-insoluble polymer" as used herein means a polymer exhibiting a solubility in water of not more than 10 g as measured by drying the polymer to a constant weight at 105° C. for 2 hours and then dissolving the dried polymer in 100 g of water at 25° C.

The solubility in water of the polymer is preferably not more than 5 g and more preferably not more than 1 g. In the case where the polymer is in the form of an anionic polymer, the solubility means a solubility of the polymer whose anionic groups are neutralized completely (i.e., 100%) with sodium hydroxide.

Examples of the water-insoluble polymer used in the present invention include polyesters, polyurethanes and vinyl-based polymers. Among these polymers, preferred are vinyl-based polymers obtained by addition-polymerizing vinyl monomers (such as vinyl compounds, vinylidene compounds and vinylene compounds) from the viewpoint of improving storage stability of the ink.

The vinyl-based polymer used in the present invention is preferably a vinyl-based polymer that is produced by copolymerizing a monomer mixture containing (a) an ionic monomer (hereinafter also referred to merely as a "component (a)") and (b) a hydrophobic monomer (hereinafter also referred to merely as a "component (b)") (such a mixture is hereinafter also referred to merely as a "monomer mixture") from the viewpoint of improving storage stability and ejection properties of the ink. The vinyl-based polymer contains a constitutional unit derived from the component (a) and a constitutional unit derived from the component (b).

Examples of the ionic monomer (a) include anionic monomers and cationic monomers. Among these monomers, preferred are anionic monomers from the viewpoint of improving dispersion stability of the colorant-containing polymer particles in the ink. Examples of the anionic monomers include carboxylic acid monomers, sulfonic acid monomers and phosphoric acid monomers. Specific examples of the carboxylic acid monomers include acrylic acid, methacrylic acid, maleic acid, fumaric acid and 2-methacryloyloxymethylsuccinic acid.

Among the anionic monomers, from the viewpoint of improving dispersion stability of the colorant-containing polymer particles in the ink, preferred are the carboxylic acid monomers, and more preferred is at least one monomer selected from the group consisting of acrylic acid and methacrylic acid.

Examples of the hydrophobic monomer (b) include alkyl (meth)acrylates, styrene-based monomers and aromatic group-containing (meth)acrylates. Specific examples of the alkyl (meth)acrylates include those alkyl (meth)acrylates containing an alkyl group preferably having not less than 1 and not more than 22 carbon atoms and more preferably not less than 6 and not more than 18 carbon atoms.

The term "(meth)acrylate" as used herein means at least one compound selected from the group consisting of an acrylate and a methacrylate.

Specific examples of the styrene-based monomers include styrene, 2-methyl styrene and divinyl benzene. Among these styrene-based monomer, from the viewpoint of improving dispersion stability of the colorant-containing polymer particles in the ink, more preferred is styrene.

Specific examples of the aromatic group-containing (meth)acrylates include benzyl (meth)acrylate and phenoxyethyl (meth)acrylate. Among these aromatic group-containing (meth)acrylates, preferred is benzyl (meth)acrylate.

As the hydrophobic monomer (b), two or more kinds of the above monomers may be used, and a combination of the styrene-based monomer and the aromatic group-containing (meth)acrylate may also be used. Although benzyl (meth) acrylate may be used in combination with styrene, from the viewpoint of improving dispersion stability of the colorant-containing polymer particles in the ink, it is preferred that benzyl (meth)acrylate is used alone.

The vinyl-based polymer preferably further contains a constitutional unit derived from (c) a macromer (hereinafter also referred to merely as a "component (c)") from the viewpoint of improving dispersion stability of the colorant-containing polymer particles in the ink.

The macromer (c) is in the form of a compound containing a polymerizable functional group at one terminal end thereof and preferably having a number-average molecular weight of not less than 500 and not more than 100,000. Examples of the polymerizable functional group bonded to one terminal end of the macromer include a (meth)acryloyloxy group and the like. Among these polymerizable functional groups, a methacryloyloxy group is preferred from the viewpoint of improving dispersion stability of the colorant-containing polymer particles in the ink. The number-average molecular weight of the macromer (c) is more preferably not less than 1,000 and not more than 10,000. Meanwhile, the number-average molecular weight of the macromer (c) may be measured by gel permeation chromatography using chloroform, etc., as a solvent as well as using polystyrene, etc., as a reference standard substance.

As the macromer (c), from the viewpoint of improving dispersion stability of the colorant-containing polymer particles in the ink, there is preferably used at least one macromer selected from the group consisting of an aromatic group-containing monomer-based macromer and a silicone-based macromer. Among these macromers, more preferred is the aromatic group-containing monomer-based macromer.

Examples of an aromatic group-containing monomer constituting the aromatic group-containing monomer-based macromer include those aromatic group-containing monomers as described with respect to the aforementioned hydrophobic monomer (b). Among these aromatic group-containing monomers, preferred is at least one monomer selected from the group consisting of styrene and benzyl (meth) acrylate, and more preferred is styrene.

Examples of the silicone-based macromer include organopolysiloxanes containing a polymerizable functional group bonded to one terminal end thereof, etc.

From the viewpoint of improving dispersion stability of the colorant-containing polymer particles in the ink, it is preferred that the vinyl-based polymer further contain a constitutional unit derived from (d) a nonionic monomer (hereinafter also referred to merely as a "component (d)").

Examples of the component (d) include polyalkylene glycol (meth)acrylates, alkoxy polyalkylene glycol (meth) acrylates, and phenoxy (ethylene glycol/propylene glycol copolymer) (n=1 to 30 in which n for ethylene glycol: 1 to 29) (meth)acrylates. Among these compounds as the component (d), from the viewpoint of improving dispersion stability of the colorant-containing polymer particles in the ink, preferred are alkoxy polyalkylene glycol (meth)acrylates, and more preferred are methoxy polyethylene glycol (n=1 to 30) (meth)acrylates.

The aforementioned components (a) to (d) may be respectively used alone or in combination of any two or more thereof.

Upon production of the vinyl-based polymer, the contents of the above components (a) to (d) in the monomer mixture (contents of non-neutralized components; hereinafter defined in the same way) or the contents of the constitutional units derived from the components (a) to (d) in the water-insoluble polymer are as follows.

The content of the component (a) is preferably not less than 2% by mass, more preferably not less than 5% by mass and even more preferably not less than 8% by mass, and is also preferably not more than 40% by mass, more preferably not more than 30% by mass and even more preferably not more than 25% by mass, from the viewpoint of improving dispersion stability of the colorant-containing polymer particles in the ink.

The content of the component (b) is preferably not less than 5% by mass and more preferably not less than 10% by mass, and is also preferably not more than 98% by mass and more preferably not more than 80% by mass, from the viewpoint of improving dispersion stability of the colorant-containing polymer particles in the ink.

The content of the component (c) is preferably not less than 1% by mass and more preferably not less than 5% by mass, and is also preferably not more than 25% by mass and more preferably not more than 20% by mass, from the viewpoint of improving dispersion stability of the colorant-containing polymer particles in the ink.

The content of the component (d) is preferably not less than 5% by mass and more preferably not less than 10% by mass, and is also preferably not more than 50% by mass and more preferably not more than 40% by mass, from the viewpoint of improving dispersion stability of the colorant-containing polymer particles in the ink.

In addition, in the case of containing the component (c), the mass ratio of the component (a) to a sum of the component (b) and the component (c) [component (a)/ [component (b)+component (c)]] is preferably not less than 0.01, more preferably not less than 0.02 and even more preferably not less than 0.03, and is also preferably not more than 1.00, more preferably not more than 0.67 and even more preferably not more than 0.50, from the viewpoint of improving dispersion stability of the colorant-containing polymer particles in the ink.

The weight-average molecular weight of the water-insoluble polymer is preferably not less than 5,000, more preferably not less than 10,000 and even more preferably not less than 20,000, and is also preferably not more than 500,000, more preferably not more than 400,000, even more preferably not more than 300,000 and further even more preferably not more than 200,000, from the viewpoint of improving dispersion stability of the colorant-containing polymer particles in the ink as well as from the viewpoint of enhancing image density of the ink.

The aforementioned water-insoluble polymer may be produced by copolymerizing the aforementioned monomer mixture by known polymerization methods. As the suitable polymerization methods, there may be used, for example, a solution polymerization method in which the monomer mixture is polymerized under heating in a solvent in the presence of a polymerization initiator, a chain transfer agent or the like.

After completion of the polymerization reaction, the polymer thus produced may be isolated and purified from the reaction solution by a known method such as reprecipitation and removal of solvent by distillation.

(Method for Production of Colorant-Containing Polymer Particles)

The colorant-containing polymer particles may be produced, for example, by the method of subjecting a mixture containing the water-insoluble polymer, an organic solvent, the colorant and water, if required together with a neutralizing agent, a surfactant, etc., to dispersion treatment to obtain a dispersion of colorant-containing polymer particles; and then removing the organic solvent from the thus obtained dispersion to obtain an aqueous dispersion of the colorant-containing polymer particles.

As the method of producing the dispersion of the colorant-containing polymer particles, there is preferably used such a method in which the water-insoluble polymer is first dissolved in the organic solvent to obtain a solution of the water-insoluble polymer, and then the colorant and water, if required, together with a neutralizing agent, a surfactant and the like, are added and mixed in the obtained solution of the water-insoluble polymer to obtain an oil-in-water type dispersion of the colorant-containing polymer particles. The order of addition of the respective components to the organic solvent solution of the water-insoluble polymer is not particularly limited, and it is preferred that water, the neutralizing agent and the colorant are successively added in this order.

The organic solvent used for dissolving the water-insoluble polymer therein is not particularly limited, and is preferably selected from aliphatic alcohols having not less than 1 and not more than 3 carbon atoms, ketones having not less than 3 and not more than 5 carbon atoms, ethers, esters and the like. Of these organic solvents, more preferred are ketones, and even more preferred is methyl ethyl ketone. In the case where the water-insoluble polymer is synthesized by a solution polymerization method, the solvent used in the polymerization method may be used as such in the aforementioned method for producing the dispersion of the colorant-containing polymer particles.

In the case where the water-insoluble polymer is an anionic polymer, an anionic group contained in the water-insoluble polymer may be neutralized using a neutralizing agent. When using the neutralizing agent, the pH value of the water-insoluble polymer is preferably controlled to not less than 7 and not more than 11. Examples of the neutralizing agent include bases such as lithium hydroxide, sodium hydroxide, potassium hydroxide, ammonia and various amines. In addition, the water-insoluble polymer may be previously neutralized.

The content of the colorant in the aforementioned dispersion of the colorant-containing polymer particles is preferably not less than 5% by mass and more preferably not less than 10% by mass, and is also preferably not more than 50% by mass and more preferably not more than 40% by mass, from the viewpoint of improving dispersion stability of the colorant-containing polymer particles in the ink.

The mass ratio of the colorant to the water-insoluble polymer [colorant/water-insoluble polymer] is preferably not less than 50/50, more preferably not less than 60/40 and even more preferably not less than 70/30, and is also preferably not more than 90/10 and more preferably not more than 80/20, from the viewpoint of improving dispersion stability of the colorant-containing polymer particles in the ink and the aqueous medium.

The method of dispersing the aforementioned dispersion is not particularly limited. The dispersion of the colorant-containing polymer particles is preferably dispersed using a known kneader, disperser, etc., to control the volume-average particle size ($D_v$) of the colorant-containing polymer particles to a desired value.

The organic solvent may be removed from the resulting dispersion by any known methods to thereby obtain an aqueous dispersion of the colorant-containing polymer particles. The organic solvent is preferably substantially completely removed from the thus obtained aqueous dispersion containing the colorant-containing polymer particles. However, the residual organic solvent may be present in the aqueous dispersion unless the objects and advantageous effects of the present invention are adversely affected by the residual organic solvent. The content of the residual organic solvent in the aqueous dispersion of the colorant-containing polymer particles is preferably not more than 0.1% by weight and more preferably not more than 0.01% by weight. In addition, if required, the dispersion may be subjected to heating and stirring treatments before removing the organic solvent therefrom by distillation.

The resulting aqueous dispersion of the colorant-containing polymer particles is preferably subjected to filtration using a wire mesh screen, etc., to remove coarse particles or the like therefrom. In addition, from the viewpoints of enhancing productivity and storage stability of the aqueous dispersion, the colorant-containing polymer particles may be subjected to crosslinking treatment, or various additives that can be optionally used in the below-mentioned water-based ink, such as an organic solvent, an antiseptic agent and a mildew-proof agent may be added to the aqueous dispersion of the colorant-containing polymer particles.

The solid content of the aqueous dispersion of the colorant-containing polymer particles is preferably not less than 5% by mass, more preferably not less than 10% by mass and even more preferably not less than 15% by mass, and is also preferably not more than 50% by mass, more preferably not more than 45% by mass, even more preferably not more than 40% by mass and further even more preferably not more than 35% by mass, from the viewpoints of enhancing productivity and storage stability of the aqueous dispersion as well as from the viewpoint of obtaining the ink that is excellent in adhesion to various resin recording media, gloss and anti-blocking properties upon storage of the recording media after printing.

[Optional Components of Water-Based Ink]

The water-based ink of the present invention may contain various additives such as an organic solvent, a penetrant, a dispersant, a surfactant, a viscosity modifier, a defoaming agent, an antiseptic agent, a mildew-proof agent, a rust preventive, a pH controller, an antioxidant, an ultraviolet absorber, etc.

Examples of the organic solvent that may be used in the water-based ink include polyhydric alcohols, polyhydric alcohol alkyl ethers, polyhydric alcohol aryl ethers, cyclic carbonates, nitrogen-containing heterocyclic compounds, amides, amines and sulfur-containing compounds.

Examples of the polyhydric alcohols include ethylene glycol, diethylene glycol, triethylene glycol, polyethylene glycol, propylene glycol, dipropylene glycol, tripropylene glycol, polypropylene glycol, 1,3-propanediol, 1,2-butanediol, 1,3-butanediol, 2,3-butanediol, 1,4-butanediol, 3-methyl-1,3-butanediol, 1,5-pentanediol, 1,2-hexanediol, 1,6-hexanediol, 2-methyl-2,4-pentanediol, tetraethylene glycol, glycerin, 1,2,6-hexanetriol, 1,2,4-butanetriol, 1,2,3- butanetriol, 3-methyl-1,3,5-pentanetriol, 2-ethyl-1,3-hexanediol and 2,2,4-trimethyl-1,3-pentanediol.

Examples of the polyhydric alcohol alkyl ethers include ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoisobutyl ether, tetraethylene glycol monomethyl ether, propylene glycol monoethyl ether, dipropylene glycol monobutyl ether, dipropylene glycol monomethyl ether, tripropylene glycol monomethyl ether and tripropylene glycol monobutyl ether.

Examples of the polyhydric alcohol aryl ethers include ethylene glycol monophenyl ether and ethylene glycol monobenzyl ether.

Examples of the cyclic carbonates include ethylene carbonate and propylene carbonate.

Examples of the nitrogen-containing heterocyclic compounds include N-methyl-2-pyrrolidone, N-hydroxyethyl-2-pyrrolidone, 2-pyrrolidone, 1,3-dimethyl imidazolidinone and ε-caprolactam.

Examples of the amides include formamide, N-methyl formamide and N,N-dimethyl formamide.

Examples of the amines include monoethanolamine, diethanolamine, triethanolamine, monoethylamine, diethylamine and triethylamine.

Examples of the sulfur-containing compounds include dimethyl sulfoxide, sulfolane, thiodiethanol and thiodiglycol.

These organic solvents may be used alone or in combination of any two or more thereof, and are preferably used in combination of any two or more thereof.

Among these organic solvents, preferred is at least one compound selected from the group consisting of the polyhydric alcohols, polyhydric alcohol alkyl ethers and nitrogen-containing heterocyclic compounds, and more preferred is at least one compound selected from the group consisting of diethylene glycol, propylene glycol, dipropylene glycol, 1,2-butanediol, 1,2-hexanediol, glycerin, diethylene glycol monomethyl ether, dipropylene glycol monomethyl ether and 2-pyrrolidone.

The content of the organic solvent in the ink is preferably not less than 5% by mass and more preferably not less than 10% by mass, and is also preferably not more than 40% by mass and more preferably not more than 35% by mass, from the viewpoint of improving dispersion stability of the ink.

Examples of the surfactant include a nonionic surfactant, an anionic surfactant, an amphoteric surfactant, a silicone-based surfactant and a fluorine-based surfactant.

Specific examples of the nonionic surfactant include glycol ethers such as polyoxyethylene alkyl ethers, acetylene glycols, polyoxyethylene alkyl phenyl ethers, polyoxyethylene alkyl esters and polyoxyethylene sorbitan fatty acid esters.

Specific examples of the anionic surfactant include polyoxyethylene alkyl ether acetic acid salts, dodecyl benzene sulfonic acid salts, succinic acid ester sulfonic acid salts, lauric acid salts and salts of polyoxyethylene alkyl ether sulfates.

Specific examples of the amphoteric surfactant include lauryl aminopropionic acid salts, lauryl dimethyl betaine, stearyl dimethyl betaine, lauryl dihydroxyethyl betaine, lauryl dimethylamine oxide, myristyl dimethylamine oxide, stearyl dimethylamine oxide and dihydroxyethyl laurylamine oxide.

Specific examples of the silicone-based surfactant include polyester-modified silicones and polyether-modified silicones.

Specific examples of the fluorine-based surfactant include perfluoroalkyl sulfonic acid compounds, perfluoroalkyl carboxylic acid compounds, perfluoroalkyl phosphoric acid ester compounds and perfluoroalkyl ethyleneoxide adducts.

These surfactants may be used alone or in combination of any two or more thereof.

Among these surfactants, preferred is at least one surfactant selected from the group consisting of nonionic surfactants and silicone-based surfactants; more preferred is at least one surfactant selected from the group consisting of glycol ethers, acetylene glycols, polyester-modified silicones and polyether-modified silicones; even more preferred is at least one surfactant selected from the group consisting of acetylene glycols and glycol ethers; and further even more preferred is at least one surfactant selected from the group consisting of acetylene glycols and polyoxyethylene alkyl ethers.

The content of the surfactant in the ink is preferably not less than 0.1% by mass and more preferably not less than 0.3% by mass, and is also preferably not more than 5% by mass and more preferably not more than 2% by mass, from the viewpoint of improving dispersion stability of the ink.

The defoaming agent used in the present invention is not particularly limited, and may be appropriately selected according to the aimed objects. Examples of the defoaming agent include silicone-based defoaming agents, polyether-based defoaming agents and fatty acid ester-based defoaming agents.

Examples of the antiseptic agent and mildew-proof agent include 1,2-benzisothiazolin-3-one, sodium dehydroacetate, sodium sorbate, sodium 2-pyridinethiol-1-oxide, sodium benzoate and sodium pentachlorophenol.

Examples of the rust preventive include acid sulfites, sodium thiosulfate, ammonium thiodiglycolate, diisopropyl ammonium nitrite and pentaerythritol tetranitrate.

The pH controller used in the present invention is not particularly limited as long as it is capable of controlling the pH value of the ink to not less than 7 without causing any adverse influence on the ink prepared, and any optional materials may be used as the pH controller according to the objects as aimed. Examples of the pH controller include amines such as diethanolamine and triethanolamine; hydroxides of alkali metals such as lithium hydroxide, sodium hydroxide and potassium hydroxide; carbonates of alkali metals such as lithium carbonate, sodium carbonate and potassium carbonate; and ammonium hydroxide and quaternary ammonium hydroxide.

Examples of the antioxidant include phenol-based antioxidants (inclusive of hindered phenol-based antioxidants), amine-based antioxidants, sulfur-based antioxidants and phosphorus-based antioxidants.

Examples of the ultraviolet absorbers include benzophenone-based ultraviolet absorbers, benzotriazole-based ultraviolet absorbers and salicylate-based ultraviolet absorbers.

[Process for Producing Water-Based Ink]

The water-based ink of the present invention may be produced, for example, by mixing the aqueous dispersion of the polyester resin particles, the aqueous dispersion of the modified polyolefin resin particles and the colorant-containing aqueous dispersion.

In the production of the water-based ink, at least one of the aforementioned optional components may be further mixed in the obtained mixed dispersion. The mixing of the respective components may be conducted, for example, using various stirring apparatuses.

The suitable contents of the polyester resin particles, the modified polyolefin resin particles and the colorant in the water-based ink are respectively the same as described above.

The content of water in the water-based ink is preferably not less than 30% by mass, more preferably not less than 40% by mass and even more preferably not less than 50% by mass, and is also preferably not more than 90% by mass, more preferably not more than 80% by mass and even more preferably not more than 75% by mass, from the viewpoint of maintaining an adequate viscosity of the resulting ink.

[Ink-Jet Printing Method]

The water-based ink of the present invention can be used as an ink for ink-jet printing. In the suitable embodiment of the ink-jet printing method using the water-based ink of the present invention, after allowing the water-based ink of the present invention to adhere to a resin printing medium by an ink-jet printing method, the resin printing medium onto which the water-based ink has been adhered is heated to a temperature of not lower than 40° C. and not higher than 100° C. As a result, the resins constituting the polyester resin particles and the modified polyolefin resin particles in the water-based ink are diffused over a printed surface of the resin printing medium, and acts as a fusing assistant for the colorant upon forming a coating film of the ink thereon, so that it is possible to further improve adhesion of the ink to the resin printing medium.

The water-based ink of the present invention can be used in the fields of office printing as well as commercial and industrial printing for preparation of catalogues, leaflets or fliers, packages, labels, etc. The water-based ink of the present invention can be suitably applied to printing on a non-water absorbing or low-water absorbing printing medium made of a resin such as PET (polyethylene terephthalate), PVC (polyvinyl chloride), PP (polypropylene) and NY (nylon), and therefore are suitable for commercial and industrial printing.

Meanwhile, the "non-water absorbing or low-water absorbing" printing medium as used in the present invention means that the water absorption of the printing medium as measured under the condition that a contact time between the printing medium and water is 100 milliseconds is not less than 0 g/m² and not more than 10 g/m².

The resin printing medium may be formed of at least one material selected from the group consisting of a polyethylene terephthalate film, a polyvinyl chloride film, a polypropylene film and a nylon film. As the resin printing medium, there may also be used a base material that is subjected to corona treatment.

Examples of the generally available film as the resin printing medium include "LUMIRROR T60" (available from Toray Industries Inc.; polyethylene terephthalate), "PVC80B P" (available from Lintec Corp.; polyvinyl chloride), "DGS-210WH" (available from Roland DG Corporation; polyvinyl chloride), "Transparent Polyvinyl Chloride RE-137" (available from Mimaki Engineering Co., Ltd.; polyvinyl chloride), "KINATH KEE 70CA" (available from Lintec Corp.; polyethylene), "YUPO SG90 PAT1" (available from Lintec Corp.; polypropylene), "FOR" and "FOA" (both available from Futamura Chemical Co, Ltd.; polypropylene), "BONYL RX" (available from Kohjin Film & Chemicals Co., Ltd.; nylon) and "EMBLEM ONBC" (available from UNITIKA Ltd.; nylon).

The ink-jet printing method according to the present invention may be carried out using a known ink-jet printing apparatus. Examples of the ink-jet printing apparatus include a thermal-type ink-jet printing apparatus and a piezoelectric-type ink-jet printing apparatus. The water-based ink of the present invention is preferably used as a water-based ink for the piezoelectric-type ink-jet printing apparatus.

The heating temperature of the resin printing medium is preferably not lower than 50° C. and more preferably not lower than 60° C., and is also preferably not higher than 90° C. and more preferably not higher than 85° C., from the viewpoint of obtaining the ink that is excellent in adhesion to various resin recording media.

With respect to the aforementioned embodiments, the present invention further provides the following aspects relating to the water-based ink and the ink-jet printing method.

<1> A water-based ink including a colorant, polyester resin particles and modified polyolefin resin particles, in which the polyester resin particles are constituted of a resin containing an amorphous polyester having a glass transition temperature of not lower than 40° C. and not higher than 100° C., and a mass ratio of the polyester resin particles to the modified polyolefin resin particles (polyester resin particles/modified polyolefin resin particles) is not less than 10/90 and not more than 90/10.

<2> The water-based ink according to the aspect <1>, wherein the mass ratio of the polyester resin particles to the modified polyolefin resin particles (polyester resin particles/modified polyolefin resin particles) is preferably not less than 20/80, more preferably not less than 30/70 and even more preferably not less than 40/60, and is also preferably not more than 80/20, more preferably not more than 70/30 and even more preferably not more than 60/40.

<3> The water-based ink according to the aspect <1> or <2>, wherein a content of the polyester resin particles in the water-based ink is preferably not less than 0.5% by mass, more preferably not less than 1.0% by mass, even more preferably not less than 1.5% by mass and further even more preferably not less than 2.0% by mass, and is also preferably not more than 30% by mass, more preferably not more than 15% by mass, even more preferably not more than 10% by mass, further even more preferably not more than 5.0% by mass and still further even more preferably not more than 3.0% by mass.

<4> The water-based ink according to any one of the aspects <1> to <3>, wherein a content of the modified polyolefin resin particles in the water-based ink is preferably not less than 0.5% by mass, more preferably not less than 1.0% by mass, even more preferably not less than 1.5% by mass and further even more preferably not less than 2.0% by mass, and is also preferably not more than 30% by mass, more preferably not more than 15% by mass, even more preferably not more than 10% by mass, further even more preferably not more than 5.0% by mass and still further even more preferably not more than 3.0% by mass.

<5> The water-based ink according to any one of the aspects <1> to <4>, wherein a total content of the polyester resin particles and the modified polyolefin resin particles in the water-based ink is preferably not less than 1% by mass, more preferably not less than 2% by mass and even more preferably not less than 3% by mass, and is also preferably not more than 35% by mass, more preferably not more than 20% by mass, even more preferably not more than 15% by mass and further even more preferably not more than 10% by mass.

<6> The water-based ink according to any one of the aspects <1> to <5>, wherein a volume-average particle size ($D_v$) of the polyester resin particles is preferably not less than 40 nm, more preferably not less than 50 nm and even more preferably not less than 70 nm, and is also preferably not more than 500 nm, more preferably not more than 200 nm and even more preferably not more than 100 nm.

<7> The water-based ink according to any one of the aspects <1> to <6>, wherein a volume-average particle size ($D_v$) of the modified polyolefin resin particles is preferably not less than 40 nm, more preferably not less than 50 nm, even more preferably not less than 60 nm and further even more preferably not less than 70 nm, and is also preferably not more than 500 nm, more preferably not more than 200 nm, even more preferably not more than 150 nm, further even more preferably not more than 120 nm and still further even more preferably not more than 100 nm.

<8> The water-based ink according to any one of the aspects <1> to <7>, wherein a ratio of the volume-average particle size ($D_v$) of the polyester resin particles to the volume-average particle size ($D_v$) of the modified polyolefin resin particles (volume-average particle size ($D_v$) of polyester resin particles/volume-average particle size ($D_v$) of modified polyolefin resin particles) is preferably not less than 0.1, more preferably not less than 0.5, even more preferably not less than 0.7 and further even more preferably not less than 0.8, and is also preferably not more than 10, more preferably not more than 5.0, even more preferably not more than 2.0 and further even more preferably not more than 1.5.

<9> The water-based ink according to any one of the aspects <1> to <8>, wherein a glass transition temperature of the amorphous polyester is preferably not lower than 50° C., more preferably not lower than 60° C. and even more preferably not lower than 62° C., and is also preferably not higher than 90° C., more preferably not higher than 82° C., even more preferably not higher than 75° C. and further even more preferably not higher than 70° C.

<10> The water-based ink according to any one of the aspects <1> to <9>, wherein a content of the amorphous polyester in the resin constituting the polyester resin particles is preferably not less than 90% by mass, more preferably not less than 95% by mass and even more preferably not less than 98% by mass, and is also not more than 100% by mass, and further even more preferably 100% by mass.

<11> The water-based ink according to any one of the aspects <1> to <10>, wherein a content of the amorphous polyester in the water-based ink is preferably not less than 0.5% by mass, more preferably not less than 1.0% by mass and even more preferably not less than 1.5% by mass, and is also preferably not more than 30% by mass, more preferably not more than 15% by mass and even more preferably not more than 10% by mass.

<12> The water-based ink according to any one of the aspects <1> to <11>, wherein an alcohol component of the amorphous polyester preferably includes at least one compound selected from the group consisting of alkyleneoxide adducts of bisphenol A, hydrogenated products of bisphenol A and aliphatic diols having not less than 3 and not more than 6 carbon atoms which contain a hydroxy group bonded to a secondary carbon atom therein, more preferably at least one compound selected from the group consisting of alkyleneoxide adducts of bisphenol A and hydrogenated products of bisphenol A, even more preferably alkyleneoxide adducts of bisphenol A, and further even more preferably propyleneoxide adducts of bisphenol A.

<13> The water-based ink according to any one of the aspects <1> to <12>, wherein a carboxylic acid component of the n amorphous polyester preferably includes at least one compound selected from the group consisting of isophthalic acid, terephthalic acid, fumaric acid, adipic acid, sebacic acid and dodecenyl succinic acid, and more preferably at least one compound selected from the group consisting of terephthalic acid, fumaric acid and adipic acid.

<14> The water-based ink according to any one of the aspects <1> to <13>, wherein a softening point of the amorphous polyester is preferably not lower than 70° C., more preferably not lower than 80° C. and even more preferably not lower than 90° C., and is also preferably not higher than 165° C., more preferably not higher than 130° C. and even more preferably not higher than 110° C.

<15> The water-based ink according to any one of the aspects <1> to <14>, wherein an acid value of the amorphous polyester is preferably not less than 5 mgKOH/g, more preferably not less than 10 mgKOH/g and even more preferably not less than 15 mgKOH/g, and is also preferably not more than 35 mgKOH/g, more preferably not more than 30 mgKOH/g and even more preferably not more than 25 mgKOH/g.

<16> The water-based ink according to any one of the aspects <1> to <15>, wherein a content of the modified polyolefin in the water-based ink is preferably not less than 0.5% by mass, more preferably not less than 1.0% by mass, even more preferably not less than 1.5% by mass and even more preferably not less than 2.0% by mass, and is also preferably not more than 25% by mass, more preferably not more than 15% by mass and even more preferably not more than 10% by mass.

<17> The water-based ink according to any one of the aspects <1> to <16>, wherein the modified polyolefin resin particles are obtained in the form of a dispersion of the modified polyolefin resin particles which is prepared by dispersing a resin containing the modified polyolefin in an aqueous medium.

<18> The water-based ink according to any one of the aspects <1> to <17>, wherein the modified polyolefin is preferably in the form of a modified product of a homopolymer of an olefin or a copolymer of two or more kinds of olefins, more preferably a modified product of at least one compound selected from the group consisting of polypropylene, a propylene-α-olefin copolymer and an ethylene-vinyl acetate copolymer, and even more preferably polypropylene or a propylene-α-olefin copolymer.

<19> The water-based ink according to any one of the aspects <1> to <18>, wherein a weight-average molecular weight of the modified polyolefin is preferably not less than 10,000, more preferably not less than 15,000 and even more preferably not less than 50,000, and is also preferably not more than 200,000 and more preferably not more than 150,000.

<20> The water-based ink according to any one of the aspects <1> to <19>, wherein the modified polyolefin is preferably a polyolefin that is modified with a chlorine-containing polarity-imparting agent, a polyolefin that is modified with an unsaturated carboxylic acid-based compound or a hydroxy-modified polyolefin, and more preferably a chlorinated polyolefin.

<21> The water-based ink according to any one of the aspects <1> to <20>, wherein a content of the colorant in the water-based ink is preferably not less than 1% by mass, more preferably not less than 2% by mass and even more preferably not less than 3% by mass, and is also preferably not more than 25% by mass, more preferably not more than 10% by mass and even more preferably not more than 5% by mass.

<22> The water-based ink according to any one of the aspects <1> to <21>, wherein a mass ratio of the colorant to a sum of the polyester resin particles and the modified polyolefin resin particles [colorant/(polyester resin particles+modified polyolefin resin particles)] in the water-based ink is preferably not less than 10/90, more preferably not less than 20/80, even more preferably not less than 30/70 and further even more preferably not less than 40/60, and is also preferably not more than 80/20, more preferably not more than 70/30, even more preferably not more than 60/40 and further even more preferably not more than 50/50.

<23> The water-based ink according to any one of the aspects <1> to <22>, wherein the colorant is in the form of colorant-containing polymer particles, and a volume-average particle size ($D_v$) of the colorant-containing polymer particles is preferably not less than 40 nm and more preferably not less than 50 nm, and is also preferably not more than 200 nm and more preferably not more than 150 nm.

<24> An ink-jet printing method including the steps of allowing the water-based ink according to any one of the aspects <1> to <23> to adhere onto a resin printing medium by an ink-jet printing method; and then heating the resin printing medium onto which the water-based ink is adhered, to a temperature of not lower than 40° C. and not higher than 100° C.

<25> The ink-jet printing method according to the aspect <24>, wherein the resin printing medium is formed of at least one material selected from the group consisting of a polyethylene terephthalate film, a polyvinyl chloride film, a polypropylene film and a nylon film.

<26> The ink-jet printing method according to the aspect <24> or <25>, wherein a heating temperature of the resin printing medium is preferably not lower than 50° C. and more preferably not lower than 60° C., and is also preferably not higher than 90° C. and more preferably not higher than 85° C.

EXAMPLES

The present invention is more specifically described below by referring to the following Examples, etc. In the following Examples, etc., various properties were measured by the following methods.

[Acid Value of Polyester]

The acid value of the polyester was measured by the same method as prescribed in JIS K 0070 except that a mixed solvent containing acetone and toluene at a volume ratio [acetone: toluene] of 1:1 was used as a solvent for the measurement.

[Softening Point of Polyester]

Using a flow tester "CFT-500D" available from Shimadzu Corporation, 1 g of a sample was extruded through a nozzle having a die pore diameter of 1 mm and a length of 1 mm while heating the sample at a temperature rise rate of 6° C./minute and applying a load of 1.96 MPa thereto by a plunger. The softening point was determined as the temperature at which a half amount of the sample was flowed out when plotting a downward movement of the plunger of the flow tester relative to the temperature.

[Crystallinity Index of Polyester]

Using a differential scanning calorimeter "Q-100" available from TA Instruments Japan Inc., a sample was weighed in an amount of 0.01 to 0.02 g in an aluminum pan, and cooled from room temperature (20° C.) to 0° C. at a temperature drop rate of 10° C./minute and then allowed to stand as such under the conditions for 1 minute, and the sample was further heated to 180° C. at a temperature rise rate of 10° C./minute to measure an endothermic heat amount thereof. Among the endothermic peaks observed in the thus measured characteristic curve, the temperature of the peak having a largest peak area was defined as an endothermic maximum peak temperature (1). The crystallinity index of the sample was calculated from the following formula:

$$\text{Crystallinity Index} = (\text{Softening Point (° C.)}) / (\text{Endothermic Maximum Peak Temperature (1) (° C.)})$$

[Glass Transition Temperature of Polyester]

Using a differential scanning calorimeter "Q-100" available from TA Instruments Japan Inc., a sample was weighed in an amount of 0.01 to 0.02 g in an aluminum pan, heated to 200° C. and then cooled from 200° C. to 0° C. at a temperature drop rate of 10° C./minute, and the sample was then heated at a temperature rise rate of 10° C./minute to measure an endothermic heat amount thereof. Among the endothermic peaks observed in the thus measured characteristic curve, the temperature of the peak having a largest peak area was defined as an endothermic maximum peak temperature (2). If any endothermic peak was observed in the characteristic curve, the endothermic peak temperature observed was defined as a glass transition temperature of the sample. On the other hand, when a shift of the characteristic curve was observed without any peaks, the temperature at which a tangential line having a maximum inclination of the curve in the portion of the curve shift was intersected with an extension of the baseline on the high-temperature side of the curve shift was read as the glass transition temperature.

[Volume Average Particle Sizes ($D_v$) of Polyester Resin Particles and Modified Polyolefin Resin Particles]

(1) Measuring Apparatus: Zeta potential/particle size analyzing system "ELSZ-2" commercially available from Otsuka Electrics Co., Ltd.

(2) Measuring Conditions: Cumulative Analysis

The dispersion of the particles to be measured was diluted with water to prepare a dilute dispersion of the particles having a concentration of about $5 \times 10^{-3}\%$ by mass, and the resulting dispersion was charged into a cell for measurement of an average particle size thereof. The measurement was conducted at a temperature of 25° C. and a cumulative number of 100 times, and a refractive index of water (1.333) was input to the analyzing system as a refractive index of the dispersing medium.

[Solid Content of Aqueous Dispersion of Polyester Resin Particles]

Using an infrared moisture meter "FD-230" available from Kett Electric Laboratory, 5 g of a sample to be measured was dried at a drying temperature of 150° C. under a measuring mode 96 (monitoring time: 2.5 minutes/variation range: 0.05%) to measure a water content (% by mass) of an aqueous dispersion thereof. The solid content of the aqueous dispersion was calculated according to the following formula:

$$\text{Solid Content (\% by mass)} = 100 - \text{Water Content (\% by mass)}.$$

[Weight-Average Molecular Weight of Water-Insoluble Polymer (Anionic Polymer)]

In the following measuring apparatus and analyzing columns, the weight-average molecular weight of the water-insoluble polymer was measured by gel permeation chromatography by using N,N-dimethyl formamide in which phosphoric acid and lithium bromide were dissolved in amounts of 60 mmol/L and 50 mmol/L, respectively, as an eluent. The molecular weights (Mw; Mn) of the sample were calculated on the basis of a calibration curve previously prepared. The calibration curve of the respective molecular weights was prepared by using several kinds of monodisperse polystyrenes "TSKgel Standard Polystyrene" (tradename); type names: "A-500", "A-2500", "F-1" and "F-10" all available from Tosoh Corporation, as reference standard samples. The sample was dissolved in N,N-dimethyl formamide to prepare a solution thereof having a solid content of 0.3% by mass.
<Measuring Conditions>
Measuring apparatus: "HLC-8120GPC" available from Tosoh Corporation;
Analyzing columns: "TSK-GEL α-M" x 2 available from Tosoh Corporation;
Column temperature: 40° C.; and
Flow rate: 1 mL/min.
[Solid Content of Aqueous Dispersion of Colorant-Containing Polymer Particles (Pigment-Containing Anionic Polymer Particles)]

Ten grams (10.0 g) of sodium sulfate dried to constant weight in a desiccator were weighed and charged in a 30 mL polypropylene reaction vessel (inner diameter ϕ: 40 mm; height: 30 mm), and about 1.0 g of a sample to be measured was added to the reaction vessel. The contents of the reaction vessel were mixed and then accurately weighed. The resulting mixture was maintained in the reaction vessel at 105° C. for 2 hours to remove volatile components therefrom, and further allowed to stand in a desiccator for 15 minutes to measure a mass thereof. The mass of the sample after removing the volatile components therefrom was regarded as a mass of solids therein. The solid content of the sample was calculated by dividing the mass of the solids by the mass of the sample initially added.
[Volume-Average Particle Size ($D_v$) of Colorant-Containing Polymer Particles (Pigment-Containing Anionic Polymer Particles)]

The particles to be measured were subjected to cumulant analysis using a laser particle analyzing system "ELS-8000" available from Otsuka Electrics Co., Ltd., to measure an average particle size thereof. The measurement was conducted using a dispersion of the particles to be measured which was prepared by diluting the dispersion of the particles with water such that a concentration of the particles in the dispersion was reduced to about $5 \times 10^{-3}$% by mass. The measurement conditions were a temperature of 25° C., an angle between incident light and detector of 90° and a cumulative number of 100 times, and a refractive index of water (1.333) was input to the analyzing system as a refractive index of the dispersing medium.
[Evaluation of Adhesion Properties]

The water-based ink was charged into an ink-jet printer "IPSiO GX 2500" (piezoelectric type) available from Ricoh Co., Ltd. Using the ink-jet printer, A4-size solid image printing was conducted on a biaxially stretched PET film "LUMIRROR 75T60" available from Toray Industries Inc., a PVC film "Transparent Polyvinyl Chloride RE-137" available from Mimaki Engineering Co., Ltd., a corona-treated PP film "FOR-15" available from Futamura Chemical Co, Ltd., and a biaxially stretched corona-treated nylon film "EMBLEM ONBC" available from UNITIKA Ltd. The respective films provided with the thus printed solid image were dried using a dryer at 80° C. for 10 minutes, and then allowed to stand in an environmental test chamber at room temperature (25° C.) and a relative humidity of 50% for one day to prepare a sample. Thereafter, a tape with a length of 5 cm and a width of 15 mm "CELLOTAPE CT15 (registered trademark)" available from Nichiban Co., Ltd., was attached onto the printed surface of the sample such that a 4 cm-length portion of the tape was adhered onto the solid image portion thereof whereas the remaining 1 cm-length portion of the tape was left unattached as a margin. Then, the tape was peeled off from the sample at a peel angle of 90° C. and a peel rate of 10 cm/sec to observe a residual area of the solid image on the printed surface of the sample from which the tape was peeled off, by naked eyes and evaluate adhesion of the ink to the respective films according to the following 10 ratings. As the score (number of points) of the evaluation of the peel test was increased, the ink was more excellent in adhesion to the respective films.
<Evaluation Ratings>
Residual area of the solid image was 100%; 10 points;
Residual area of the solid image was not less than 90% and less than 100%; 9 points;
Residual area of the solid image was not less than 80% and less than 90%; 8 points;
Residual area of the solid image was not less than 70% and less than 80%; 7 points;
Residual area of the solid image was not less than 60% and less than 70%; 6 points;
Residual area of the solid image was not less than 50% and less than 60%; 5 points;
Residual area of the solid image was not less than 40% and less than 50%; 4 points;
Residual area of the solid image was not less than 30% and less than 40%; 3 points;
Residual area of the solid image was not less than 20% and less than 30%; 2 points;
Residual area of the solid image was not less than 10% and less than 20%; 1 point; and
Residual area of the solid image was less than 10%; 0 point;
[Evaluation of Gloss]

The water-based ink was charged into an ink-jet printer "IPSiO GX 2500" (piezoelectric type) available from Ricoh Co., Ltd. Using the ink-jet printer, A4-size solid image printing was conducted on a biaxially stretched PET film "LUMIRROR 75T60" available from Toray Industries Inc. The film provided with the thus printed solid image was dried using a dryer at 80° C. for 10 minutes, and then allowed to stand in an environmental test chamber at room temperature (25° C.) and a relative humidity of 50% for one day to prepare a sample. Thereafter, the thus prepared sample was placed on a KP cut paper available from KPPC Co., Ltd., such that the printed surface of the sample faced upward, to measure a gloss of an elliptic area (3 mm×6 mm) on the printed surface to be measured at an incident angle of 60° C. using a gloss meter "IG-300" available from HORIBA Ltd. The larger the measured value, the more excellent the gloss of the water-based ink.
[Evaluation of Anti-Blocking Properties]

The water-based ink was charged into an ink-jet printer "IPSiO GX 2500" (piezoelectric type) available from Ricoh Co., Ltd. Using the ink-jet printer, A4-size solid image printing was conducted on a biaxially stretched PET film "LUMIRROR 75T60" available from Toray Industries Inc. The film provided with the thus printed solid image was dried using a dryer at 80° C. for 10 minutes, and then allowed to stand in an environmental test chamber at room temperature (25° C.) and a relative humidity of 50% for one day to prepare a sample. Thereafter, two sheet-like test specimens each having a size of 2 cm×5 cm were cut from the thus prepared sample. The two test specimens were overlapped such that the printed surfaces thereof faced to each other, and sandwiched under such a condition between glass plates. Then, a load of 20 g was applied onto the sandwiched test specimens, and the test specimens were allowed to stand in a constant temperature oven at 40° C. for 12 hours. Thereafter, the test specimens were further allowed to stand at room temperature (20° C.) for 1 hour, and then peeled off from each other to observe the respective printed surfaces of the test specimens by naked eyes to thereby measure a peeled-off area of the solid image thereon and evaluate anti-blocking properties of the ink according to the following four ratings. The smaller the peeled-off area of the solid image, the more excellent the anti-blocking properties of the ink.

(Evaluation Ratings)

Peeled-off area of the solid image was 0%: A

Peeled-off area of the solid image was more than 0% and not more than 10%: B

Peeled-off area of the solid image was more than 10% and less than 30%: C

Peeled-off area of the solid image was not less than 30%: D

Production Example 1

(Production of Polyester A)

An inside atmosphere of a 10 L four-necked flask equipped with a thermometer, a stainless steel stirring bar, a flow-down type condenser and a nitrogen inlet tube was replaced with nitrogen, and 3534 g of polyoxypropylene (2.2)-2,2-bis(4-hydroxyphenyl)propane, 1173 g of terephthalic acid and 10 g of dibutyl tin oxide were charged into the flask. The contents of the flask were heated to 230° C. in a nitrogen atmosphere while stirring and maintained at 230° C. for 5 hours, and then the pressure within the flask was reduced and maintained under 8.3 kPa for 1 hour.

Thereafter, the contents of the flask were cooled to 210° C., and after the pressure within the flask was returned to atmospheric pressure, 293 g of fumaric acid and 2.5 g of 4-tert-butyl catechol were added to the flask. The contents of the flask were maintained at 210° C. for 5 hours, and then the pressure within the flask was reduced and maintained under 8.3 kPa for 4 hours, thereby obtaining a polyester A. The properties of the thus obtained polyester A are shown in Table 1.

Production Example 2

(Production of Polyester B)

An inside atmosphere of a 10 L four-necked flask equipped with a thermometer, a stainless steel stirring bar, a flow-down type condenser and a nitrogen inlet tube was replaced with nitrogen, and 2047 g of polyoxypropylene (2.2)-2,2-bis(4-hydroxyphenyl)propane, 691 g of polyoxyethylene (2.2)-2,2-bis(4-hydroxyphenyl)propane, 638 g of hydrogenated bisphenol A (2,2-bis(4-hydroxycyclohexyl)propane), 1500 g of terephthalic acid and 10 g of dibutyl tin oxide were charged into the flask.

The contents of the flask were heated to 230° C. in a nitrogen atmosphere while stirring and maintained at 230° C. for 4 hours, and then the pressure within the flask was reduced and maintained under 8.3 kPa for 1 hour. Thereafter, the contents of the flask were cooled to 210° C., and after the pressure within the flask was returned to atmospheric pressure, 123 g of fumaric acid and 2.5 g of 4-tert-butyl catechol were added to the flask. The contents of the flask were maintained at 210° C. for 4 hours, and then the pressure within the flask was reduced and maintained under 8.3 kPa for 3 hours, thereby obtaining a polyester B. The properties of the thus obtained polyester B are shown in Table 1.

Production Example 3

(Production of Polyester C)

An inside atmosphere of a 10 L four-necked flask equipped with a thermometer, a stainless steel stirring bar, a flow-down type condenser and a nitrogen inlet tube was replaced with nitrogen, and 1784 g of polyoxypropylene (2.2)-2,2-bis(4-hydroxyphenyl)propane, 1657 g of polyoxyethylene (2.2)-2,2-bis(4-hydroxyphenyl)propane, 846 g of terephthalic acid and 10 g of dibutyl tin oxide were charged into the flask. The contents of the flask were heated to 230° C. in a nitrogen atmosphere while stirring and maintained at 230° C. for 4 hours, and then the pressure within the flask was reduced and maintained under 8.3 kPa for 1 hour. Thereafter, the contents of the flask were cooled to 210° C., and after the pressure within the flask was returned to atmospheric pressure, 118 g of fumaric acid, 595 g of adipic acid and 2.5 g of 4-tert-butyl catechol were added to the flask. The contents of the flask were maintained at 210° C. for 4 hours, and then the pressure within the flask was reduced and maintained under 8.3 kPa for 3 hours, thereby obtaining a polyester C. The properties of the thus obtained polyester C are shown in Table 1.

Production Example 4

(Production of Polyester D)

An inside atmosphere of a 10 L four-necked flask equipped with a thermometer, a stainless steel stirring bar, a flow-down type condenser and a nitrogen inlet tube was replaced with nitrogen, and 1718 g of 1,2-propanediol, 655 g of fumaric acid, 2627 g of terephthalic acid, 10 g of dibutyl tin oxide and 2.5 g of 4-tert-butyl catechol were charged into the flask. The contents of the flask were heated 180° C. in a nitrogen atmosphere while stirring, and then further heated to 210° C. over 5 hours. The contents of the flask were further heated to 220° C., and then the pressure within the flask was reduced and maintained under 8.3 kPa for 3 hours, thereby obtaining a polyester D. The properties of the thus obtained polyester D are shown in Table 1.

Production Example 5

(Production of Polyester E)

An inside atmosphere of a 10 L four-necked flask equipped with a thermometer, a stainless steel stirring bar, a flow-down type condenser and a nitrogen inlet tube was replaced with nitrogen, and 1919 g of polyoxypropylene (2.2)-2,2-bis(4-hydroxyphenyl)propane, 1316 g of hydrogenated bisphenol A (2,2-bis(4-hydroxycyclohexyl)propane), 1638 g of terephthalic acid and 10 g of dibutyl tin oxide were charged into the flask. The contents of the flask were heated to 230° C. in a nitrogen atmosphere while stirring and maintained at 230° C. for 4 hours, and then the pressure within the flask was reduced and maintained under 8.3 kPa for 1 hour.

Thereafter, the contents of the flask were cooled to 210° C., and after the pressure within the flask was returned to atmospheric pressure, 127 g of fumaric acid and 2.5 g of 4-tert-butyl catechol were added to the flask. The contents of the flask were maintained at 210° C. for 4 hours, and then the pressure within the flask was reduced and maintained under 8.3 kPa for 3 hours, thereby obtaining a polyester E. The properties of the thus obtained polyester E are shown in Table 1.

Production Example 6

(Production of Polyester F)

An inside atmosphere of a 10 L four-necked flask equipped with a thermometer, a stainless steel stirring bar, a flow-down type condenser and a nitrogen inlet tube was replaced with nitrogen, and 3535 g of polyoxypropylene (2.2)-2,2-bis(4-hydroxyphenyl)propane, 168 g of terephthalic acid, 1180 g of adipic acid and 10 g of dibutyl tin oxide were charged into the flask. The contents of the flask were heated to 230° C. in a nitrogen atmosphere while stirring and maintained at 230° C. for 4 hours, and then the pressure within the flask was reduced and maintained under 8.3 kPa for 1 hour. Thereafter, the contents of the flask were cooled to 210° C., and after the pressure within the flask was returned to atmospheric pressure, 117 g of fumaric acid and 2.5 g of 4-tert-butyl catechol were added to the flask. The contents of the flask were maintained at 210° C. for 4 hours, and then the pressure within the flask was reduced and maintained under 8.3 kPa for 3 hours, thereby obtaining a polyester F. The properties of the thus obtained polyester F are shown in Table 1.

Production Example 7

(Production of Aqueous Dispersion of Polyester Resin Particles A)

A 1 L four-necked flask equipped with a nitrogen inlet tube, a reflux condenser, a stirrer "Three-One-Motor BL300" available from Shinto Scientific Co., Ltd., and a thermocouple was charged with 200 g of the polyester A, and then 200 g of methyl ethyl ketone was charged into the flask at 30° C. and mixed with the polyester A to dissolve the polyester resin therein. Next, 37.1 g of a 5% by mass sodium hydroxide aqueous solution was charged into the flask, and the contents of the flask were stirred for 30 minutes to obtain an organic solvent-based slurry. Then, 600 g of deionized water was added dropwise to the thus obtained slurry at 30° C. while stirring at a dropping rate of 20 mL/minute. Thereafter, the contents of the flask were heated to 60° C., and then while stepwise reducing the pressure within the flask from 80 kPa to 30 kPa, methyl ethyl ketone was distilled off therefrom, and a part of water was further distilled off therefrom. The contents of the flask were cooled to 25° C. and then filtered through a 150 mesh wire screen, and deionized water was added to the filtered product to adjust a solid content thereof to 30% by mass, thereby obtaining an aqueous dispersion of polyester resin particles A. The properties of the thus obtained aqueous dispersion are shown in Table 2.

TABLE 1

| | | | Production Example 1 Polyester A | | Production Example 2 Polyester B | | Production Example 3 Polyester C | | Production Example 4 Polyester D | | Production Example 5 Polyester E | | Production Example 6 Polyester F | |
|---|---|---|---|---|---|---|---|---|---|---|---|---|---|---|
| | | Polyester | g | mole parts *4 | g | mole parts *4 | g | mole parts *4 | g | mole parts *4 | g | mole parts *4 | g | mole parts *4 |
| Raw material monomers | Alcohol component | BPA-PO(*1) | 3534 | 100 | 2047 | 55 | 1784 | 50 | — | — | 1919 | 50 | 3535 | 100 |
| | | BPA-EO(*2) | — | — | 691 | 20 | 1657 | 50 | — | — | — | — | — | — |
| | | HBPA(*3) | — | — | 638 | 25 | — | — | — | — | 1316 | 50 | — | — |
| | | 1,2-propanediol | — | — | — | — | — | — | 1718 | 100 | — | — | — | — |
| | Acid component | Fumaric acid | 293 | 25 | 123 | 10 | 118 | 10 | 655 | 25 | 127 | 10 | 117 | 10 |
| | | Terephthalic acid | 1173 | 70 | 1500 | 85 | 846 | 50 | 2627 | 70 | 1638 | 90 | 168 | 10 |
| | | Adipic acid | — | — | — | — | 595 | 40 | — | — | — | — | 1180 | 80 |
| Esterification catalyst | Dibutyl tin oxide (g) | | 10 | | 10 | | 10 | | 10 | | 10 | | 10 | |
| Radical polymerization inhibitor | 4-tert-Butyl catechol (g) | | 2.5 | | 2.5 | | 2.5 | | 2.5 | | 2.5 | | 2.5 | |
| Properties of polyester | Softening point (° C.) | | 104 | | 128 | | 88 | | 105 | | 143 | | 69 | |
| | Glass transition temperature (° C.) | | 63 | | 80 | | 45 | | 63 | | 93 | | 25 | |
| | Crystallinity index | | 1.5 | | 1.5 | | 1.7 | | 1.6 | | 1.5 | | 2.2 | |
| | Acid value (mgKOH/g) | | 20 | | 18 | | 20 | | 17 | | 19 | | 20 | |

Note:
(*1)BPA-PO; Polyoxypropylene (2.2)-2,2-bis(4-hydroxyphenyl)propane.
(*2)BPA-EO; Polyoxyethylene (2.2)-2,2-bis(4-hydroxyphenyl)propane.
(*3)HBPA; Hydrogenated bisphenol A (2,2-bis(4-hydroxycyclohexyl)propane).
*4 Mole parts of respective monomers constituting the polyester on the basis of 100 mole parts of a total amount of monomers in the alcohol component.

Production Examples 8 to 12

(Production of Aqueous Dispersions of Polyester Resin Particles B to F)

The same procedure as in Production Example 7 was repeated except that the kind of polyester and the amount of the 5% by mass sodium hydroxide aqueous solution added were changed as shown in Table 2, thereby obtaining aqueous dispersions of polyester resin particles B to F. The properties of the thus obtained aqueous dispersions are shown in Table 2.

TABLE 2

|  |  | Production Example 7 | Production Example 8 | Production Example 9 | Production Example 10 | Production Example 11 | Production Example 12 |
|---|---|---|---|---|---|---|---|
| Aqueous dispersion of polyester resin particles | | Polyester resin particles A | Polyester resin particles B | Polyester resin particles C | Polyester resin particles D | Polyester resin particles E | Polyester resin particles F |
| Polyester | Kind | Polyester A | Polyester B | Polyester C | Polyester D | Polyester E | Polyester F |
|  | Amount compounded (g) | 200 | 200 | 200 | 200 | 200 | 200 |
| Methyl ethyl ketone (g) | | 200 | 200 | 200 | 200 | 200 | 200 |
| 5% by mass sodium hydroxide aqueous solution (g) | | 37.1 | 35.9 | 39.9 | 33.9 | 35.2 | 37.1 |
| Deionized water (g) | | 600 | 600 | 600 | 600 | 600 | 600 |
| Properties, etc. | Volume-average particle size of resin particles (nm) | 85 | 91 | 88 | 80 | 75 | 80 |
|  | Solid content (% by mass) | 30 | 30 | 30 | 30 | 30 | 30 |
|  | pH | 6.9 | 6.9 | 7.0 | 6.8 | 7.2 | 7.3 |
|  | Degree of neutralization (mol %) | 65 | 70 | 70 | 70 | 65 | 65 |

Production Example 13

(Production of Aqueous Dispersion of Colorant (Pigment)-Containing Polymer Particles)
(1) Synthesis of Water-Insoluble Polymer (Anionic Polymer)

Three hundred ninety-nine grams (399 g) of benzyl methacrylate available from Wako Pure Chemical Industries, Ltd., 91 g of methacrylic acid available from Wako Pure Chemical Industries, Ltd., 140 g of methoxypolyethylene glycol methacrylate "M-230G" (tradename; average molar number of addition of oxyethylene groups: 23) available from Shin-Nakamura Chemical Co., Ltd., and 140 g of a styrene macromonomer "AS-6S" (tradename; solid content: 50%) available from Toagosei Co., Ltd., were mixed with each other to prepare a monomer mixed solution (770 g). A reaction vessel was charged with 15.75 g of methyl ethyl ketone, 0.350 g of a chain transfer agent (2-mercaptoethanol) and 10% by mass (77 g) of the aforementioned monomer mixed solution, and the contents of the reaction vessel were mixed with each other, followed by replacing an inside atmosphere of the reaction vessel with nitrogen.

On the other hand, 80% by mass (616 g) of the aforementioned monomer mixed solution, 2.45 g of the aforementioned chain transfer agent, 173.25 g of methyl ethyl ketone and 5.6 g of a polymerization initiator "V-65" (tradename; 2,2'-azobis(2,4-dimethyl valeronitrile)) available from Wako Pure Chemical Industries, Ltd., were mixed with each other and charged into a dropping funnel. The mixed solution within the reaction vessel was heated to 75° C. in a nitrogen atmosphere while stirring, and the mixed solution within the dropping funnel was added dropwise into the reaction vessel over 4.5 hours. Thereafter, the remaining 10% by mass (77 g) of the aforementioned monomer mixed solution, 0.7 g of the aforementioned chain transfer agent, 126 g of methyl ethyl ketone and 1.4 g of the aforementioned polymerization initiator were mixed with each other to prepare a second-stage dropping solution, and the second-stage dropping solution was added dropwise into the reaction vessel over 1.7 hours.

After completion of the dropwise addition, the contents of the reaction vessel were mixed with 2.1 g of the aforementioned initiator, and the resulting mixture was heated to 80° C., followed by stirring the mixture for 1.5 hours. The aforementioned procedure including the mixing with the aforementioned initiator as well as the subsequent heating and stirring was repeated two more times, thereby obtaining a polymer solution (weight-average molecular weight of polymer: 26,000).

(2) Production of Aqueous Dispersion of Pigment-Containing Polymer Particles (Pigment-Containing Anionic Polymer Particles)

Twenty grams (20 g) of the polymer obtained by drying the polymer solution obtained in the aforementioned item (1): "Synthesis of Water-Insoluble Polymer (Anionic Polymer)" under reduced pressure were dissolved in 62.8 g of methyl ethyl ketone, and then 5.01 g of a 5 N sodium hydroxide aqueous solution, 1.13 g of a 25% by mass ammonia aqueous solution and 236.5 g of ion-exchanged water were added to the resulting solution. The obtained mixed solution was mixed while stirring at a temperature of 10 to 15° C. using a disper blade at a rotating speed of 2,000 r/min for 15 minutes.

Successively, 45 g of a magenta pigment: PV19 "Inkjet Magenta E5B02" (tradename) available from Clariant Japan K.K., and 25 g of a magenta pigment: PR122 "6111T" (tradename) available from Dai-Nichi Seika Color & Chemicals Mfg. Co., Ltd., were added to the aforementioned mixed solution, and the resulting mixture was mixed while stirring at a temperature of 10 to 15° C. using a disper blade at a rotating speed of 7,000 r/min for 3 hours. The thus obtained dispersion was subjected to 200 mesh filtration, and then subjected to 20-pass dispersion treatment by allowing the dispersion to pass through a microfluidizer "M-110K" (high-pressure homogenizer) available from Microfluidics Corporation under a pressure of 150 MPa 20 times.

The resulting dispersion was placed under reduced pressure at 60° C. to remove methyl ethyl ketone therefrom and further remove a part of water therefrom, and then subjected to centrifugal separation to separate a liquid phase portion therefrom. The thus separated liquid phase portion of the dispersion was allowed to pass through a filter having a mesh size of 5 μm available from Sartorius Stedim Biotech GmbH to remove coarse particles therefrom. Furthermore, 80 g of the thus obtained dispersion was mixed with 0.2 g of an antiseptic agent "Ploxel XL2" (tradename) available from Avecia Corporation and 19.8 g of ion-exchanged water, and the resulting mixture was subjected to sterilization treatment at 70° C. for 1 hour and then cooled to 25° C., and further allowed to pass through the aforementioned filter having a mesh size of 5 μm, thereby obtaining an aqueous dispersion of pigment-containing polymer particles (pigment-containing anionic polymer particles) (solid content: 20% by mass; volume-average particle size ($D_v$): 133 nm).

Example 1 (Production of Water-Based Ink A)

A 100 mL screw vial was charged with 20.0 parts by mass of propylene glycol available from Wako Pure Chemical Industries, Ltd., 10.0 parts by mass of 1,2-butanediol available from Wako Pure Chemical Industries, Ltd., 1.0 part by mass of a wetting agent "Olfine E1010" (tradename; "Olfine" is a registered trademark; active ingredient: acetylene glycol-based surfactant) available from Nissin Chemical Industry Co., Ltd., and 26.6 parts by mass of ion-exchanged water, and the content of the screw vial were mixed with each other while stirring using a magnetic stirrer at room temperature for 15 minutes, thereby obtaining a mixed solution.

Next, while stirring 25.7 parts by mass (4.0 parts by mass in terms of the pigment component (on the basis of 100 parts by mass of the water-based ink)) of the aqueous dispersion of the pigment-containing anionic polymer particles obtained in Production Example 16 using a magnetic stirrer, a whole amount of the above-obtained mixed solution was added and mixed therein, and then 8.3 parts by mass (2.5 parts by mass in terms of the solid component (on the basis of 100 parts by mass of the water-based ink)) of the aqueous dispersion of the polyester resin particles A and 8.3 parts by mass (2.5 parts by mass in terms of the solid component (on the basis of 100 parts by mass of the water-based ink)) of the aqueous dispersion of the modified polyolefin resin "SUPERCHLON E-480T" (volume-average particle size ($D_v$): 75 nm: chlorine content: 21% by mass) available from Nippon Paper Industries Co., Ltd., as shown in Table 3, were further added dropwise thereto using a pipet while stirring and mixing the obtained mixture. The resulting mixture was finally subjected to filtration by passing the mixture through a filter having a mesh size of 1.2 μm "Minisart (registered trademark)" (tradename) available from Sartorius Stedim Biotech GmbH, thereby obtaining a water-based ink A. The evaluation results of the thus obtained water-based ink A are shown in Table 3.

Example 2 (Production of Water-Based Ink B)

The same procedure as in Example 1 was repeated except that the amounts of the aqueous dispersion of the polyester resin particles A and the aqueous dispersion of the modified polyolefin resin "SUPERCHLON E-480T" available from Nippon Paper Industries Co., Ltd., used in Example 1 were changed to 12.5 parts by mass (3.75 parts by mass in terms of the solid component (on the basis of 100 parts by mass of the water-based ink)) and 4.2 parts by mass (1.25 parts by mass in terms of the solid component (on the basis of 100 parts by mass of the water-based ink)), respectively, thereby obtaining a water-based ink B. The evaluation results of the thus obtained water-based ink B are shown in Table 3.

Example 3 (Production of Water-Based Ink C)

The same procedure as in Example 1 was repeated except that the amounts of the aqueous dispersion of the polyester resin particles A and the aqueous dispersion of the modified polyolefin resin "SUPERCHLON E-480T" available from Nippon Paper Industries Co., Ltd., used in Example 1 were changed to 4.2 parts by mass (1.25 parts by mass in terms of the solid component (on the basis of 100 parts by mass of the water-based ink)) and 12.5 parts by mass (3.75 parts by mass in terms of the solid component (on the basis of 100 parts by mass of the water-based ink)), respectively, thereby obtaining a water-based ink C. The evaluation results of the thus obtained water-based ink C are shown in Table 3.

Examples 4 to 7 and Comparative Example 1 (Production of Water-Based Inks D to G and K)

The same procedure as in Example 1 was repeated except that the kind of the aqueous dispersion of the polyester resin particles used in Example 1 was changed as shown in Table 3, thereby obtaining water-based inks D to G and K. The evaluation results of the thus obtained water-based inks D to G and K are shown in Table 3.

Examples 8 to 10 (Production of Water-Based Inks H to J)

The same procedure as in Example 1 was repeated except that the kind of the aqueous dispersion of the modified polyolefin resin particles used in Example 1 was changed as shown in Table 3, thereby obtaining water-based inks H to J. The evaluation results of the thus obtained water-based inks H to J are shown in Table 3.

Comparative Example 2 (Production of Water-Based Ink L)

The same procedure as in Example 1 was repeated except that the amount of the aqueous dispersion of the polyester resin particles A used in Example 1 was changed to 16.7 parts by mass (5.0 parts by mass in terms of the solid component (on the basis of 100 parts by mass of the water-based ink)), and the aqueous dispersion of the modified polyolefin resin "SUPERCHLON E-480T" available from Nippon Paper Industries Co., Ltd., was not used, thereby obtaining a water-based ink L. The evaluation results of the thus obtained water-based ink L are shown in Table 3.

Comparative Example 3 (Production of Water-Based Ink M)

The same procedure as in Example 1 was repeated except that the aqueous dispersion of the polyester resin particles A was not used, and the amount of the aqueous dispersion of the modified polyolefin resin "SUPERCHLON E-480T" available from Nippon Paper Industries Co., Ltd., used in Example 1 was changed to 16.7 parts by mass (5.0 parts by mass in terms of the solid component (on the basis of 100 parts by mass of the water-based ink)), thereby obtaining a water-based ink M. The evaluation results of the thus obtained water-based ink M are shown in Table 3.

TABLE 3

|  |  | Example 1 | Example 2 | Example 3 | Example 4 | Example 5 | Example 6 | Example 7 |
|---|---|---|---|---|---|---|---|---|
| Water-based ink | Kind | Water-based ink A | Water-based ink B | Water-based ink C | Water-based ink D | Water-based ink E | Water-based ink F | Water-based ink G |
|  | Polyester resin particles | Polyester resin particles A | Polyester resin particles A | Polyester resin particles A | Polyester resin particles B | Polyester resin particles C | Polyester resin particles D | Polyester resin particles E |
|  | Modified polyolefin resin particles | Aqueous chlorinated polyolefin (*1) | Aqueous chlorinated polyolefin (*1) | Aqueous chlorinated polyolefin (*1) | Aqueous chlorinated polyolefin (*1) | Aqueous chlorinated polyolefin (*1) | Aqueous chlorinated polyolefin (*1) | Aqueous chlorinated polyolefin (*1) |
|  | Polyester resin particles/ Modified polyolefin resin particles (mass ratio) | 50/50 | 75/25 | 25/75 | 50/50 | 50/50 | 50/50 | 50/50 |
| Evaluation results | Adhesion properties PET | 10 | 9 | 7 | 8 | 7 | 6 | 6 |
|  | PVC | 10 | 10 | 9 | 10 | 8 | 9 | 8 |
|  | PP | 10 | 7 | 10 | 8 | 7 | 6 | 6 |
|  | NY | 10 | 7 | 7 | 8 | 7 | 6 | 5 |
|  | Anti-blocking properties | A | A | B | A | C | C | B |
|  | Gloss | 120 | 115 | 108 | 108 | 85 | 75 | 100 |

|  |  | Example 8 | Example 9 | Example 10 | Comparative Example 1 | Comparative Example 2 | Comparative Example 3 |
|---|---|---|---|---|---|---|---|
| Water-based ink | Kind | Water-based ink H | Water-based ink I | Water-based ink J | Water-based ink K | Water-based ink L | Water-based ink M |
|  | Polyester resin particles | Polyester resin particles A | Polyester resin particles A | Polyester resin particles A | Polyester resin particles F | Polyester resin particles A | — |
|  | Modified polyolefin resin particles | Aqueous chlorinated polyolefin (*2) | Aqueous maleic acid-modified polyolefin (*3) | Aqueous acrylic-modified polyolefin (*4) | Aqueous chlorinated polyolefin (*1) | — | Aqueous chlorinated polyolefin (*1) |
|  | Polyester resin particles/ Modified polyolefin resin particles (mass ratio) | 50/50 | 50/50 | 50/50 | 50/50 | 100/0 | 0/100 |
| Evaluation results | Adhesion properties PET | 8 | 6 | 6 | 4 | 4 | 1 |
|  | PVC | 10 | 10 | 8 | 4 | 4 | 6 |
|  | PP | 8 | 7 | 7 | 4 | 1 | 10 |
|  | NY | 8 | 6 | 6 | 4 | 1 | 1 |
|  | Anti-blocking properties | A | B | B | D | A | D |
|  | Gloss | 99 | 85 | 80 | 70 | 110 | 72 |

Note:
(*1) Aqueous chlorinated polyolefin: "SUPERCHLON E-480T" (aqueous product; chlorine content: 21% by mass; solid content: 30% by mass; volume-average particle size ($D_v$): 75 nm) available from Nippon Paper Industries Co., Ltd.
(*2) Aqueous chlorinated polyolefin: "HARDLEN EW-5303" (aqueous product; chlorine content: 17% by mass; solid content: 30% by mass; volume-average particle size ($D_v$): 51 nm) available from TOYOBO Co., Ltd.
(*3) Aqueous maleic acid-modified polyolefin: "HARDLEN NZ-1004" (aqueous product; solid content: 30% by mass; volume-average particle size ($D_v$): 117 nm) available from TOYOBO Co., Ltd.
(*4) Aqueous acrylic-modified polyolefin: "AUROREN AE-301" (aqueous product; solid content: 30% by mass; volume-average particle size ($D_v$): 55 nm) available from Nippon Paper Industries Co., Ltd.

From the results shown in Table 3, it was confirmed that the water-based inks obtained in Examples 1 to 10 in which the aqueous dispersion of the polyester resin particles containing the polyester having a glass transition temperature of not lower than 40° C. as well as the aqueous dispersion of the modified polyolefin resin particles were used, were excellent in adhesion to various resin recording media, gloss and anti-blocking properties upon storage of the recording media after printing, as compared to any of the water-based ink obtained in Comparative Example 1 in which the aqueous dispersion of the polyester resin particles containing the polyester having a glass transition temperature of lower than 40° C. as well as the aqueous dispersion of the modified polyolefin resin particles were used, the water-based ink obtained in Comparative Example 2 which contained no modified polyolefin, and the water-based ink obtained in Comparative Example 3 which contained no polyester.

INDUSTRIAL APPLICABILITY

In accordance with the present invention, there are provided a water-based ink that is excellent in not only adhesion to various resin recording media, but also gloss, as well as a process for producing the water-based ink. In consequence, the water-based ink and the production process according to the present invention can be suitably used in the application fields of commercial or industrial printing.

The invention claimed is:

1. A water-based ink comprising a colorant, polyester resin particles and modified polyolefin resin particles,
in which the polyester resin particles are constituted of a resin comprising an amorphous polyester having a glass transition temperature of 40° C. to 90° C., and a mass ratio of the polyester resin particles to the modified polyolefin resin particles is 30/70 to 90/10,
wherein a content of said amorphous polyester in said resin constituting said polyester resin particles is not less than 90% by mass and not more than 100% by mass, wherein said modified polyolefin resin particles comprise at least one member selected from the group consisting of aqueous chlorinated polyolefin resin particles, aqueous maleic acid-modified polyolefin resin particles, and aqueous acrylic modified polyolefin resin particles, and wherein a content of the colorant in the water-based ink is not less than 1% by mass and not more than 25% by mass.

2. The water-based ink according to claim 1, wherein a volume-average particle size ($D_v$) of the polyester resin particles is not less than 40 nm and not more than 500 nm.

3. The water-based ink according to claim 1, wherein a volume-average particle size ($D_v$) of the modified polyolefin resin particles is not less than 40 nm and not more than 500 nm.

4. The water-based ink according to claim 1, wherein the modified polyolefin resin particles are aqueous chlorinated polyolefin resin particles.

5. The water-based ink according to claim 1, wherein the colorant is in the form of colorant-containing polymer particles.

6. An ink jet printing method comprising:
allowing the water-based ink according to claim 1 to adhere onto a resin printing medium by an ink-jet printing method; and
then heating the resin printing medium onto which the water-based ink is adhered, to a temperature of not lower than 40° C. and not higher than 100° C.

7. The ink-jet printing method according to claim 6, wherein the resin printing medium is a non-water absorbing or low-water absorbing resin printing medium.

8. The ink-jet printing method according to claim 6, wherein the resin printing medium is faulted of at least one material selected from the group consisting of a polyethylene terephthalate film, a polyvinyl chloride film, a polypropylene film and a nylon film.

9. The water-based ink according to claim 1, wherein a content of the polyester resin particles in the water-based ink is not less than 0.5% by mass and not more than 30% by mass.

10. The water-based ink according to claim 1, wherein a content of the modified polyolefin resin particles in the water-based ink is not less than 0.5% by mass and not more than 30% by mass.

11. The water-based ink according to claim 1, wherein a ratio of the volume-average particle size ($D_v$) of the polyester resin particles to the volume-average particle size ($D_v$) of the modified polyolefin resin particles (volume-average particle size ($D_v$) of polyester resin particles/volume-average particle size (D) of modified polyolefin resin particles) is not less than 0.1 and not more than 10.

12. The water-based ink according to claim 1, wherein an alcohol component of the amorphous polyester includes at least one compound selected from the group consisting of alkyleneoxide adducts of bisphenol A, hydrogenated products of bisphenol A and aliphatic diols having not less than 3 and not more than 6 carbon atoms which contain a hydroxy group bonded to a secondary carbon atom therein.

13. The water-based ink according to claim 1, wherein an alcohol component of the amorphous polyester includes alkyleneoxide adducts of bisphenol A.

* * * * *